US010067430B2

(12) United States Patent
Arimura et al.

(10) Patent No.: US 10,067,430 B2
(45) Date of Patent: Sep. 4, 2018

(54) MEMBER FOR ELECTROPHOTOGRAPHY, PROCESS CARTRIDGE, AND ELECTROPHOTOGRAPHIC APPARATUS

(71) Applicant: CANON KABUSHIKI KAISHA, Tokyo (JP)

(72) Inventors: Hideya Arimura, Shizuoka (JP); Shohei Urushihara, Suntou-gun (JP); Masaki Yamada, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 95 days.

(21) Appl. No.: 15/363,135

(22) Filed: Nov. 29, 2016

(65) Prior Publication Data

US 2017/0160654 A1 Jun. 8, 2017

(30) Foreign Application Priority Data

Dec. 4, 2015 (JP) ................................ 2015-237992

(51) Int. Cl.

| | |
|---|---|
| ***B32B 9/04*** | (2006.01) |
| ***C08F 259/08*** | (2006.01) |
| ***G03G 5/043*** | (2006.01) |
| ***G03G 21/18*** | (2006.01) |
| ***G03G 15/02*** | (2006.01) |
| ***G03G 15/08*** | (2006.01) |
| ***G03G 15/16*** | (2006.01) |

(52) U.S. Cl.

CPC ........... *G03G 5/043* (2013.01); *C08F 259/08* (2013.01); *G03G 15/0233* (2013.01); *G03G 15/0812* (2013.01); *G03G 15/0818* (2013.01); *G03G 15/1685* (2013.01); *G03G 21/18* (2013.01)

(58) Field of Classification Search

CPC ............. C08G 259/08; G03G 15/0233; G03G 15/0812; G03G 15/0818; G03G 15/1685; G03G 21/18; G03G 5/043

USPC ................................ 399/286; 528/36, 42, 70

See application file for complete search history.

(56) References Cited

U.S. PATENT DOCUMENTS

2012/0195631 A1 8/2012 Yamada
2013/0028634 A1 1/2013 Koyanagi

FOREIGN PATENT DOCUMENTS

JP 57-5047 A 1/1982
JP 2009-151141 A 7/2009
JP 2014-146010 A 8/2014

*Primary Examiner* — Thao T Tran

(74) *Attorney, Agent, or Firm* — Canon U.S.A., Inc. IP Division

(57) ABSTRACT

A member for electrophotography has an electro-conductive base and at least one electro-conductive resin layer, in which the electro-conductive resin layer of the outermost layer contains urethane resin and the urethane resin has a structure of a silicone graft fluororesin and a structure represented by Formula (1)

(1)

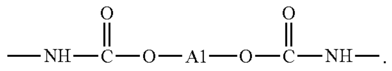

10 Claims, 6 Drawing Sheets

MEMBER FOR ELECTROPHOTOGRAPHY, PROCESS CARTRIDGE, AND ELECTROPHOTOGRAPHIC APPARATUS

BACKGROUND OF THE INVENTION

Field of the Invention

The present disclosure relates to a member for electrophotography for use in an electrophotographic apparatus and a process cartridge and an electrophotographic apparatus having the member for electrophotography.

Description of the Related Art

The member for electrophotography is a member to be used for various uses, such as a developer carrying member, a transfer member, a charging member, a developer feed member, a cleaning member, and a developer layer thickness regulation member. The member for electrophotography is sometimes provided with a surface layer on the surface from the viewpoint of high image quality and high durability. For example, in the case of the developer carrying member or the developer layer thickness regulation member, a surface layer containing urethane resin has been widely used due to excellent wear resistance and excellent charge-imparting performance to a developer.

However, in the member for electrophotography having such a surface layer, the adhesion of a developer to the surface has not been sufficiently controlled. When a large number of electrophotographic images have been formed using an electrophotographic apparatus having the member for electrophotography as a developer carrying member, for example, toner has adhered to the surface of the member for electrophotography, so that a toner thin film has been formed in some cases. Hereinafter, the phenomenon in which the toner thin film is formed may be referred to as toner filming in some cases.

Then, in order to prevent the toner filming, it has been proposed to contain fluorine atoms and silicon atoms having high releasability to a urethane resin.

Japanese Patent Laid-Open No. 2014-146010 has proposed a developing roller containing a reactant of a polyisocyanate prepolymer forming an isocyanurate and a compound having a functional group containing a fluorine atom or a silicone-based functional group as a resin component. Japanese Patent Laid-Open No. 2014-146010 describes that, in such a developing roller, the compound having the functional group containing a fluorine atom or the silicone-based functional group having low surface energy is segregated near the surface of the developing roller, and therefore the adhesion to toner can be reduced, whereby the toner filming with time can be prevented.

Moreover, Japanese Patent Laid-Open No. 2009-151141 has proposed a developing roller having a surface resin layer formed by curing a silicone graft fluororesin having a hydroxyl group with polyisocyanate.

SUMMARY OF THE INVENTION

One aspect of the present disclosure is directed to providing a member for electrophotography which has toner filming resistance and which is hard to cause plastic deformation even when a load is applied thereto over a long period of time in a high temperature and high humidity environment.

Another aspect of the present disclosure is directed to providing a process cartridge and an electrophotographic image forming apparatus capable of stably outputting a high grade electrophotographic image even in a high temperature and high humidity environment.

According to one aspect of the present disclosure, there is provided a member for electrophotography having an electro-conductive base and at least one electro-conductive resin layer, in which the electro-conductive resin layer of the outermost layer contains urethane resin and the urethane resin has a structure of a silicone graft fluororesin and a structure represented by Formula (1)

(1)

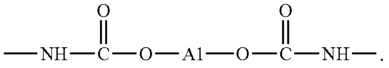

In Formula (1), A1 represents at least one structure selected from the group consisting of (A101), (A102), (A103, and (A104).

(A101) is a structure containing a structure represented by Formula (A101a) and a structure represented by either or both of Formula (A101b) and Formula (A101c), (A101a)

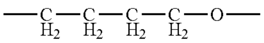

(A101b)

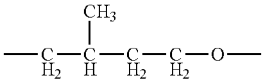

(A101c)

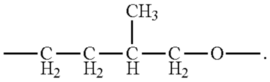

(A102) is a structure containing a constituent unit represented by Formula (A102a) and a constituent unit represented by either or both of Formula (A102b) and Formula (A102c), (A102a)

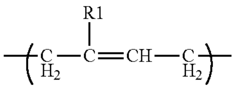

(A102b)

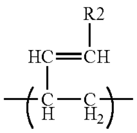

(A102c)

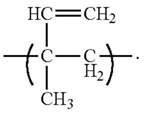

In Formulae (A102a) to (A102c), R1 and R2 each independently represent a hydrogen atom or an alkyl group having carbon atoms of 1 or more and 4 or less.

(A103) is a structure represented by Formula (A103a)

(A103a)

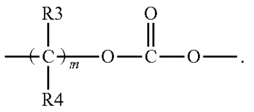

In Formula (A103a), R3 and R4 each independently represent a hydrogen atom or an alkyl group having carbon atoms of 1 or more and 4 or less and m represents an integer of 7 or more.

(A104) is a structure represented by Formula (A104a)

(A104a)

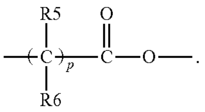

In Formula (A104a), R5 and R6 each independently represent a hydrogen atom or an alkyl group having carbon atoms of 1 or more and 4 or less and p represents an integer of 6 or more.

According to another aspect of the present disclosure, there is provided a process cartridge which is configured so as to be detachably attachable to a main body of an electrophotographic apparatus and which has the member for electrophotography described above.

According to further aspect of the present disclosure, there is provided an electrophotographic apparatus having the member for electrophotography described above.

Further features of the present disclosure will become apparent from the following description of exemplary embodiments with reference to the attached drawings.

DESCRIPTION OF THE EMBODIMENTS

Figure 1A:
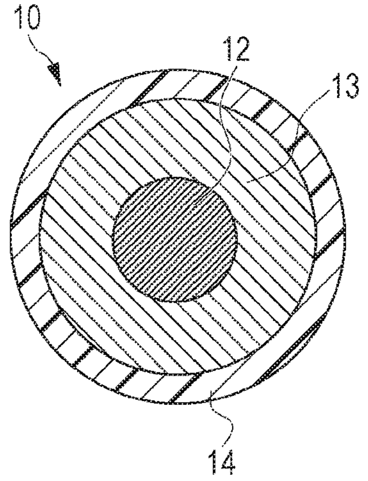
FIGS. 1A to 1C are cross-sectional views of an example of an electro-conductive roller according to one example embodiment.

A member for electrophotography according to one example embodiment is a member for electrophotography having an electro-conductive base and at least one electro-conductive resin layer, in which the electro-conductive resin layer of the outermost layer contains urethane resin and the urethane resin has a structure of a silicone graft fluororesin and a structure represented by Formula (1) shown below.

(1)

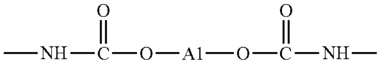

In Formula (1), A1 represents at least one structure selected from the group consisting of structures (A101) to (A104) described below.

(A101) is a structure containing a structure represented by Formula (A101a) shown below and a structure represented by either or both of Formula (A101b) and Formula (A101c) shown below, (A101a)

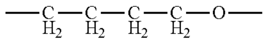

(A101b)

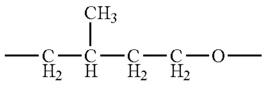

(A101c)

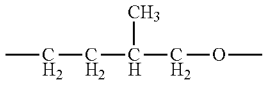

(A102) is a structure containing a constituent unit represented by Formula (A102a) shown below and a constituent unit represented by either or both of Formula (A102b) and Formula (A102c) shown below, (A102a)

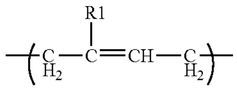

(A102b)

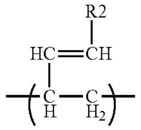

(A102c)

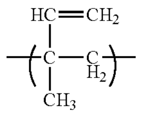

In Formulae (A102a) to (A102c), R1 and R2 each independently represent a hydrogen atom or an alkyl group having carbon atoms of 1 or more and 4 or less.

(A103) is a structure represented by Formula (A103a) shown below, (A103a)

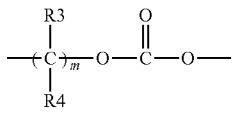

In Formula (A103a), R3 and R4 each independently represent a hydrogen atom or an alkyl group having carbon atoms of 1 or more and 4 or less and m represents an integer of 7 or more.

(A104) is a structure represented by Formula (A104a) shown below, (A104a)

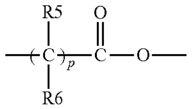

In Formula (A104a), R5 and R6 each independently represent a hydrogen atom or an alkyl group having carbon atoms of 1 or more and 4 or less and p represents an integer of 6 or more.

The present inventors presume as follows the reason why such a member for electrophotography is difficult to cause plastic deformation when a load is applied thereto over a long period of time in a high temperature and high humidity environment.

An examination by the present inventors has demonstrated that the developing rollers described in Japanese Patent Laid-Open Nos. 2014-146010 and 2009-151141 have toner filming resistance but, also when the developing rollers are allowed to stand still in a state where loads are applied thereto from other members over a long period of time in a high temperature and high humidity environment, plastic deformation has occurred in a contact portion with the other members of the surface of the developing rollers.

The portion where the plastic deformation has occurred on the developing rollers is different in toner conveyance performance from the other portions free from plastic deformation. Therefore, uneven density resulting from the plastic deformation has sometimes arose in an electrophotographic image formed using the developing rollers in which the plastic deformation has occurred. Then, the present inventors have conducted a further examination on the reason therefor, and have considered the reason as follows.

It is considered that, in the surface resin layer formed by curing a silicone graft fluororesin with polyisocyanate described in Japanese Patent Laid-Open No. 2009-151141, the structure of a silicone graft fluororesin having low polarity and a urethane bond having high polarity are mixed. Therefore, the force by which the substances having polarities close to each other aggregate works, so that the force works in the direction where the silicone graft fluororesin having low polarity and the urethane bond are separated from each other. Moreover, the structure derived from isocyanate also has high crystallinity. Therefore, the siloxane structures of the silicone graft fluororesin are likely to be pushed out to the outside of the crystal structure to aggregate. As a result, it is presumed that the siloxane structures of the silicone graft fluororesin having high degree of freedom aggregate to form a domain in the surface resin layer.

Such a domain is held by a relatively weak intermolecular interaction. Therefore, when the member for electrophotography receives loads from other members, so that the resin is deformed, the domain is easily collapsed. Then, the urethane bonds in the surface resin layer which do not approach each other until then approach each other to form a new hydrogen bond. The hydrogen bond is a relatively strong bond. Therefore, the surface resin layer is easily fixed in a state of being deformed from the original state. As a result, it is considered that, when the resin layer having the structure of the silicone graft fluororesin is allowed to stand over a long period of time in the state where loads are applied thereto from other members, plastic deformation is likely to occur.

As a result of a further examination by the present inventors based on the consideration, it was found that the occurrence of the plastic deformation can be prevented by compounding a specific structure, i.e., the structure represented by Formula (1), into urethane resin.

It is considered that the structure represented by Formula (1) is a structure having polarity lower than the polarity of the polyisocyanate according to Japanese Patent Laid-Open No. 2009-151141, and therefore the polarity difference generated between the urethane bond and the siloxane structure can be reduced. It is considered that the structure represented by Formula (1) is a structure having low crystallinity, and therefore the crystallization of the entire urethane resin can be prevented by compounding such a structure into the urethane resin. Therefore, it is presumed that, in the urethane resin having the structure represented by Formula (1), the formation of the domain by the siloxane structure itself, which is the factor of the occurrence of the plastic deformation, is prevented.

The structure represented by Formula (1) gives flexibility to urethane resin. Therefore, it is presumed that, in a layer containing the urethane resin having the structure, plastic deformation becomes large. It is considered that the softening of the urethane resin results from the fact that the polarity of the structure represented by Formula (1) is lower than that of the urethane bond in the urethane resin. More specifically, it is considered that the compounding of the structure represented by Formula (1) into the urethane resin reduces the localization state of charges in the main chain of the urethane resin, so that an interaction, such as an electrostatic interaction, between the main chains of the urethane resin is difficult to occur, whereby the urethane resin is softened.

However, when the urethane resin has the silicone graft fluororesin structure therein, the main chain of the fluororesin is rigid. Therefore, it is presumed that, even when the urethane resin has the structure represented by Formula (1), the softening of the urethane resin is prevented. More specifically, it is considered that the rigidity of the silicone graft fluororesin reinforces the urethane resin, which contributes to the prevention of the occurrence of the plastic deformation.

Member for Electrophotography

The member for electrophotography refers to an electro-conductive roller, such as a developing roller, a transfer roller, a charging roller, and a developer supplying roller, and an electro-conductive blade, such as a cleaning blade and a developing blade.

The member for electrophotography suitably has resistance required when placed in an electrophotographic apparatus. Specifically, the electrical resistance value is suitably $10^{3}\Omega\cdot cm$ or more and $10^{9}\Omega\cdot cm$ or less.

First Embodiment

Figure 1B:
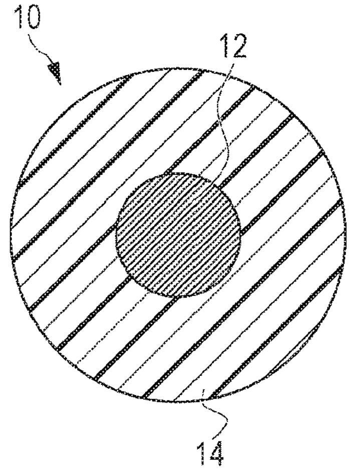
Figure 1C:
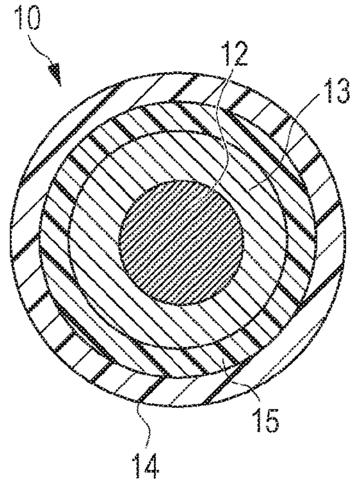

An electro-conductive roller is mentioned as an example embodiment of the member for electrophotography. FIG. 1A to FIG. 1C each represent a cross-sectional view of an example of the electro-conductive roller.

An electro-conductive roller 10 illustrated in FIG. 1A has an electro-conductive base 12 and an elastic layer 13 provided on the periphery of the electro-conductive base 12, in which an electro-conductive resin layer 14 is formed on the periphery of the elastic layer 13. The elastic layer 13 has a function of giving elasticity required for forming a nip of a predetermined width to the electro-conductive roller 10 in a contact portion of the electro-conductive roller 10 with other members, for example, an elecrophotographic photoconductor (hereinafter referred to as a photoconductor). The electro-conductive resin layer 14 contains the urethane resin having the specific structure described above.

The electro-conductive roller 10 may have two or more of the elastic layers 13. As illustrated in FIG. 1B, the electro-conductive roller 10 may be one not having the elastic layer 13. However, it is suitable for the electro-conductive roller 10 to have the elastic layer 13 from the viewpoint of securing the nip. Furthermore, the electro-conductive roller 10 may have one or two or more electro-conductive resin layers as an intermediate layer 15 in addition to the electro-conductive resin layer 14 as illustrated in FIG. 1C. In this case, it is required for at least the electro-conductive resin layer of the outermost layer to contain the urethane resin having the specific structure described above.

Base

The base 12 has a solid or hollow cylindrical shape and functions as an electrode and a support member of the electro-conductive roller 10. The base 12 contains metals, such as aluminum and copper; alloys, such as stainless steel; iron subjected to plating treatment with chromium or nickel; and conductive materials, such as synthetic resin having an electro-conductivity.

Elastic Layer

The elastic layer 13 is suitably a molded body of rubber materials. As the rubber materials, the following substances are mentioned, for example. Mentioned are an ethylene-propylene-diene copolymer rubber (EPDM), an acryl nitrile-butadiene rubber (NBR), a chloroprene rubber (CR), a natural rubber (NR), an isoprene rubber (IR), a styrene-butadiene rubber (SBR), a fluororubber, a silicone rubber, an epichlorohydrin rubber, an NBR hydride, and a urethane rubber. These rubber materials can be used alone or in combination of two or more kinds thereof.

Among these rubber materials, the silicone rubber is particularly suitable from the viewpoint of the prevention of permanent deformation due to compression and flexibility. Examples of the silicone rubber include polydimethylsiloxane, polytrifluoropropylsiloxane, polymethylvinylsiloxane, polyphenylvinylsiloxane, and copolymers of the polysiloxanes.

In the elastic layer 13, various additives, such as an electro-conductivity imparting agent, a non-conductive filler, a crosslinking agent, and a catalyst, are compounded as appropriate in the range where the purposes of compounding these additives are achieved and the effects disclosed herein are not impaired.

As the electro-conductivity imparting agent, carbon black; electro-conductive metals, such as aluminum and copper; fine particles of electro-conductive metal oxides, such as zinc oxide, tin oxide, and titanium oxide; and ion conductive agents, such as quaternary ammonium salt, can be used. Among the above, the carbon black is particularly suitable from the viewpoint of relatively easy availability and the viewpoint of electro-conductivity imparting performance and reinforcement performance.

Examples of the non-conductive filler include silica, quartz powder, titanium oxide, zinc oxide, or calcium carbonate.

The crosslinking agent is not particularly limited, and tetraethoxysilane, di-t-butylperoxide, 2,5-dimethyl-2,5-di(t-butylperoxy)hexane, or dicumyl peroxide are mentioned, for example.

The thickness of the elastic layer 13 is suitably 0.3 mm or more and 4.0 mm or less.

Electro-conductive Resin Layer

The electro-conductive resin layer 14 of the outermost layer has the structure of the silicone graft fluororesin and the structure represented by Formula (1) shown below, (1)

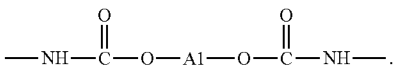

In Formula (1), A1 represents at least one structure selected from (A101) to (A104) shown below.

(A101) is a structure containing a structure represented by Formula (A101a) shown below and a structure represented by either or both of Formula (A101b) and Formula (A101c) shown below, (A101a)

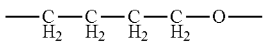

(A101b)

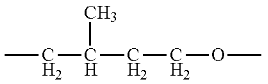

(A101c)

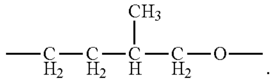

(A102) is a structure containing a constituent unit represented by Formula (A102a) shown below and a constituent unit represented by either or both of Formula (A102b) and Formula (A102c) shown below, (A102a)

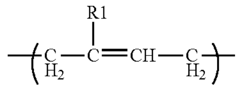

(A102b)

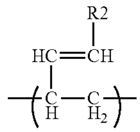

(A102c)

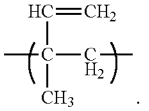

In Formulae (A102a) to (A102c), R1 and R2 each independently represent a hydrogen atom or an alkyl group having carbon atoms of 1 or more and 4 or less and it is suitable that R1 and R2 in Formula (A102a) to Formula (A102c) each independently represent a hydrogen atom or a methyl group.

(A103) is a structure represented by Formula (A103a) shown below, (A103a)

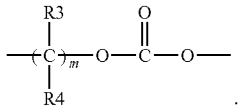

In Formula (A103a), R3 and R4 each independently represent a hydrogen atom or an alkyl group having carbon atoms of 1 or more and 4 or less and m represents an integer of 7 or more, R3 and R4 are suitably hydrogen atoms or methyl groups, and m is an integer of 9 or more and 12 or less.

(A104) is a structure represented by Formula (A104a) shown below, (A104a)

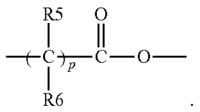

In Formula (A104a), R5 and R6 each independently represent a hydrogen atom or an alkyl group having carbon atoms of 1 or more and 4 or less and p represents an integer of 6 or more, it is suitable that R5 and R6 each independently represent a hydrogen atom or a methyl group, and p is an integer of 7 or more and 12 or less.

All the structures of (A101) to (A104) have relatively low crystallinity and have low polarity due to a structure in which the carbon atoms are continuously bonded to some extent. Therefore, it is considered that the structures prevent the aggregation of the siloxane structures in the urethane resin.

Specifically, the structures of (A101) and (A102) have a structure in which four or more carbon atoms are connected, and therefore the polarity is low and the polarity difference generated between the structure and the silicone graft fluororesin frame can be reduced. Moreover, a side chain is introduced into the main chain of the structure and the crystallinity is also kept low. For example, it is proved that the crystallinity of one having the structure represented by either or both of Formula (A101b) and Formula (A101c) is lower than the crystallinity of a polytetramethylene structure in which only the structures represented by Formula (A101a) are connected.

The structures of (A103) and (A104) have a structure in which 7 or more carbon atoms and 6 or more carbon atoms are connected, and therefore the polarity is kept low. The structures of (A103) and (A104) initially have low crystallinity, and therefore it is not always needed to introduce a side chain thereinto to reduce the crystallinity as in the structures of (A101) and (A102).

It is suitable for the structure of A1 in Formula (1) to have at least one structure selected from (A101) to (A103) among the structures of (A101) to (A104). When the structure of A1 has at least one structure selected from (A101) to (A103), plastic deformation of the member for electrophotography is more difficult to occur.

The urethane resin is suitably one having constituent units represented by Formula (2) and Formula (3) shown below, (2)

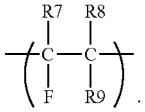

In Formula (2), R7 represents any one selected from the group consisting of a hydrogen atom, a halogen atom, an alkyl group having carbon atoms of 1 or more and 10 or less, and a substituted or unsubstituted aryl group having carbon atoms of 6 or more and 10 or less, and R8 and R9 each independently represent any one selected from the group consisting of a hydrogen atom, a halogen atom, an alkyl group having carbon atoms of 1 or more and 10 or less, and a substituted or unsubstituted aryl group having carbon atoms of 6 or more and 10 or less.

In Formula (2), it is suitable that R7 represents a fluorine atom and R8 and R9 each independently represent any one selected from the group consisting of a hydrogen atom, a fluorine atom, and a chlorine atom. R7 to R9 may vary in each constituent unit.

(3)

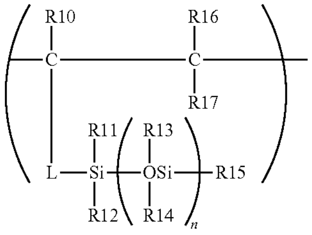

In Formula (3), R10 represents any one selected from the group consisting of a hydrogen atom, a halogen atom, an alkyl group having carbon atoms of 1 or more and 10 or less, a substituted or unsubstituted aryl group having carbon atoms of 6 or more and 10 or less, L represents a linking group, R11 to R15 each independently represent a hydrogen atom or an alkyl group having carbon atoms of 1 or more and 2 or less, R16 to R17 each independently represent any one selected from the group consisting of a hydrogen atom, a halogen atom, an alkyl group having carbon atoms of 1 or more and 10 or less, and a substituted or unsubstituted aryl group having carbon atoms of 6 or more and 10 or less, and n represents an integer of 1 or more.

The linking group L in Formula (3) is a bond formed by a known reaction of introducing the siloxane structure portion in Formula (3) into a side chain and is not particularly limited. Specific examples of the linking group L include a single bond, a straight or branched-chain alkylene group having carbon atoms of 1 or more and 2 or less, or a group in which an arbitrary carbon-carbon bond in the alkylene group is substituted by an ester bond, an ether bond, an amide bond, or a combination thereof. The number of the carbon numbers in the alkylene group is not particularly limited and is suitably 2 or more and 10 or less.

In Formula (3), R10 is suitably a hydrogen atom, a fluorine atom, or an alkyl group having carbon atoms of 1 or more and 2 or less, R11 to R14 are suitably an alkyl group having carbon atoms of 1 or more and 2 or less, R15 is suitably an alkyl group having carbon atoms of 1 or more and 2 or less, and R16 and R17 are suitably a hydrogen atom or a methyl group.

The urethane resin may have a constituent unit represented by Formula (4) shown below in addition to the constituent units represented by Formula (2) and Formula (3).

(4)

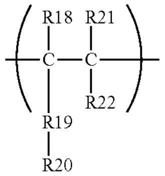

R18 in Formula (4) represents any one selected from the group consisting of a hydrogen atom, a halogen atom, an alkyl group having carbon atoms of 1 or more and 10 or less, and a substituted or unsubstituted aryl group having carbon atoms of 6 or more and 10 or less, R19 represents any one selected from the group consisting of a single bond, an ether bond, and an ester bond, R20 represents any one selected from the group consisting of an alkyl group having carbon atoms of 1 or more and 12 or less, a substituted or unsubstituted cycloalkylene group having carbon atoms of 6 or more and 10 or less, an alkenyl group having carbon atoms of 2 or more and 12 or less, and a substituted or unsubstituted aryl group having carbon atoms of 6 or more and 10 or less, and R21 and R22 each independently represent a hydrogen atom, a halogen atom, or an alkyl group having carbon atoms of 1 or more and 5 or less. R21 and R22 each are particularly suitably a hydrogen atom.

Method for Forming Electro-conductive Resin Layer

The urethane resin having the structure represented by Formula (1) is suitably a cured product obtained by cross-linking a silicone graft fluororesin having a hydroxyl group (hereinafter referred to as a "hydroxyl group-containing silicone graft fluororesin") and polyol having the structures of (A101) to (A104) with an isocyanate compound.

The electro-conductive resin layer 14 can be formed by applying a coating solution obtained by mixing the components described above onto the elastic layer 13 or the base 12, followed by drying and curing by heating. A method for applying the coating solution is not particularly limited and spray coating, dip coating, or roll coating is mentioned. A dip coating method including causing a coating solution to overflow from the upper end of a dipping tank described in Japanese Patent Laid-Open No. 57-5047 is simple and excellent in production stability as a method for forming a resin layer.

The thickness of the electro-conductive resin layer 14 is suitably 1.0 μm or more and 50 μm or less and particularly suitably 5 μm or more and 30 μm or less.

Hereinafter, the components described above contained in the coating solution are individually described.

Hydroxyl Group-Containing Silicone Graft Fluororesin

In the hydroxyl group-containing silicone graft fluororesin, the hydroxyl group reacts with an isocyanate group in an isocyanate compound described later.

Specifically, the hydroxyl group-containing silicone graft fluororesin is suitably one having the constituent units represented by Formula (2) and Formula (3) shown above and Formula (5) shown below, (5)

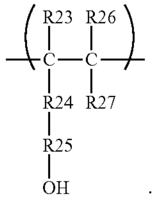

In Formula (5), R23 represents any one selected from the group consisting of a hydrogen atom, a halogen atom, a substituted or an unsubstituted alkyl group having carbon atoms of 1 or more and 10 or less, and a substituted or unsubstituted aryl group having carbon atoms of 6 or more and 10 or less. R24 represents any one selected from the group consisting of a single bond, an ether bond, and an ester bond. R25 represents any one selected from the group consisting of an alkylene group having carbon atoms of 1 or more and 10 or less, a substituted or unsubstituted cycloalkylene group having carbon atoms of 6 or more and 10 or less, an alkenylene group having carbon atoms of 2 or more and 10 or less, and a substituted or unsubstituted arylene group having carbon atoms of 6 or more and 10 or less. R26 and R27 each independently represent any one selected from the group consisting of a hydrogen atom, a halogen atom, and an alkyl group having carbon atoms of 1 or more and 5 or less. Herein, specific examples of the substituents include an alkyl group having C1 to C4, such as methyl group, ethyl group, n-propyl group and n-butyl group.

The molecular weight of the hydroxyl group-containing silicone graft fluororesin is not particularly limited and the number average molecular weight thereof is suitably 5000 or more and 2500000 or less and particularly suitably 20000 or more and 100000 or less. When the number average molecular weight is in the ranges mentioned above, the toner adhesion prevention effect is high and gelling is hard to occur in a reaction. The molecular weight (number average molecular weight) of the constituent unit portion represented by Formula (3) in the hydroxyl group-containing silicone graft fluororesin is 200 or more and 100000 or less, particularly suitably 1000 or more and 50000 or less, and still more suitably 15000 or more and 30000 or less. When the molecular weight is in the ranges mentioned above, the toner adhesion prevention effect is higher.

Commercially-available items can be used as the hydroxyl group-containing silicone graft fluororesin. Examples of the commercially-available items include "ZX001", "ZX007C", "ZX017", "ZX022", "ZX022C", and "ZX022H" (all Trade Names, manufactured by T&K TOKA Co, Ltd.), for example.

The hydroxyl group-containing silicone graft fluororesin can be obtained by the following two methods (i) and (ii).

(i) Polymerization reaction of a fluorine-containing polymerizable compound, a polymerizable compound having a siloxane structure, and a polymerizable compound having a hydroxyl group; and (ii) Polymerization reaction of a solvent soluble fluororesin having a radical polymerizable group, a polymerizable compound having a siloxane structure in the side chain, and a polymerizable compound having a hydroxyl group.

Polymerization Reaction of (i)

In the polymerization reaction of (i) described above, the hydroxyl group-containing silicone graft fluororesin can be obtained by polymerizing a fluorine-containing polymerizable compound giving the constituent unit represented by Formula (2), a polymerizable compound having a siloxane structure giving the constituent unit represented by Formula (3), and a polymerizable compound having a hydroxyl group giving the constituent unit represented by Formula (5).

The fluorine-containing polymerizable compound is suitably chlorotrifluoroethylene, tetrafluoroethylene, or α, β, β-trifluorostyrene.

Examples of the polymerizable compound having a siloxane structure include a polymerizable compound having a radical polymerizable group. Specific examples of the radical polymerizable group include a vinyl group, an allyl group, and a (meth)acryloyl group. As the polymerizable compound having a siloxane structure in the side chain, the following substances are specifically suitable;

vinyl-modified organodisiloxane, such as vinyl(trimethylsiloxy)dimethylsilane;

(meth)acryl-modified organodisiloxane, such as (meth) acryloyloxy (trimethylsiloxy)dimethylsilane;

trifluorovinyl-modified organodisiloxane, such as 5,6,6-trifluoro-5-hexenyl(triethylsiloxy)diethyl silane;

one-terminal vinyl-modified dimethyl polysiloxane;

one-terminal (meth)acryl-modified dimethyl polysiloxane; and one-terminal trifluorovinyl-modified dimethyl polysiloxane.

The number average molecular weight of the polymerizable compounds having a siloxane structure is not particularly limited and is suitably 1000 or more and 50000 or less and particularly 10000 or more and 30000 or less.

The polymerizable compounds having a siloxane structure can be prepared by a known method.

For example, the trifluorovinyl-modified organodisiloxane can be obtained by causing halosilane to react with a polymerizable compound having a trifluorovinyl group. The one-terminal-modified dimethyl polysiloxanes can be prepared by a combination of a cleavage reaction by organic lithium of cyclic siloxane and a reaction with halosilane having a radical polymerizable group, such as a chlorovinylsilane.

Commercially-available items can also be used as the polymerizable compounds having a siloxane structure in the side chain. For example, examples of the commercially-available items of the one-terminal-modified dimethyl polysiloxane include "SILAPLANE FM-0711" and "SILAPLANE FM-0725" (all Trade Names, manufactured by JNC) and "X22-174DX" (manufactured by Shin-Etsu Chemical Co., Ltd.).

The polymerizable compounds having a siloxane structure can be used alone or as a mixture of two or more kinds thereof.

As the polymerizable compound having a hydroxyl group, the following substances are mentioned;

hydroxyl group-containing (meth)acrylates, such as hydroxymethyl (meth)acrylate, 2-hydroxyethyl (meth)acrylate, 2-hydroxypropyl acrylate, 3-hydroxypropyl (meth) acrylate, 4-hydroxybutyl (meth)acrylate, 3-hydroxybutyl (meth)acrylate, 6-hydroxyhexyl (meth)acrylate, 8-hydroxyoctyl (meth)acrylate, ethyl 2-(hydroxymethyl) (meth) acrylate, 2-hydroxy-3-phenoxypropyl (meth)acrylate, and 1,4-cyclohexane dimethanol mono(meth)acrylate; and hydroxyl group-containing vinylethers, such as 2-hydroxyethylvinylether, 3-hydroxypropylvinylether, 4-hydroxybutylvinylether, 6-hydroxyhexylvinylether, diethylene glycol monovinylether, and 2-ethyl 1-vinyloxyhexane.

When the "(meth)acrylate" is referred to, acrylates and/or methacrylates are referred to. The polymerizable compounds having a hydroxyl group can be used alone or as a mixture of two or more kinds thereof.

The hydroxyl group-containing silicone graft fluororesin may be obtained by polymerizing a polymerizable compound giving the constituent unit represented by Formula (4) shown above in combination with the polymerizable compounds described above. Specific examples of such polymerizable compounds are the following substances;

(meth)acrylates, such as ethyl (meth)acrylate, t-butyl (meth)acrylate, isobutyl (meth)acrylate, n-butyl (meth) acrylate, n-hexyl methacrylate, n-octyl (meth) acrylate, n-lauryl (meth)acrylate, 2-ethylhexyl (meth)acrylate, and cyclohexyl (meth)acrylate; and vinyl ethers, such as methylvinylether, ethylvinylether, t-butylvinylether, isobutylvinylether, n-butylvinylether, n-hexylvinylether, n-octylvinylether, n-laurylvinylether, 2-ethylhexylvinylether, and cyclohexylvinylether.

For the polymerization reaction, known arbitrary polymerization reaction methods can be used. In particular, a solution radical polymerization method or a nonaqueous dispersion radical polymerization method is suitably used.

As polymerization initiators, photoradical initiators and thermal radical initiators can be used. Examples of the photoradical initiators include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borate salts, active esters, active halogens, inorganic complexes, and coumarins. These initiators may be used alone or as a mixture. The photoradical initiators are suitably used in the range of 0.1 part by mass or more and 15 parts by mass or less based on 100 parts by mass of monomers. Moreover, photosensitization agents, such as n-butylamine and triethylamine, may be added as necessary. As the thermal radical initiators, organic or inorganic peroxides and organic azo and diazo compounds can be used.

The urethane resin obtained by the polymerization reaction of (i) described above has the constituent unit represented by Formula (2) shown above and the constituent unit represented by Formula (3) shown above in the same chain. Specifically, the urethane resin has a structure represented by Formula (6) shown below, (6)

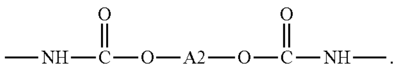

In Formula (6), A2 is a structure containing the constituent unit represented by Formula (2) shown above and the constituent unit represented by Formula (3) shown above.

Polymerization reaction of (ii)

The hydroxyl group-containing silicone graft fluororesin can be obtained by using a solvent soluble fluororesin having a radical polymerizable group in place of the fluorine-containing polymerizable compound in the polymerization reaction of (i) described above.

The solvent soluble fluororesin having a radical polymerizable group can be obtained by introducing a radical polymerizable group into a solvent soluble fluororesin.

The solvent soluble fluororesin is a fluororesin which dissolves in an organic solvent and has advantages in that the solvent soluble fluororesin can react in an organic solvent and is easily dissolved in an organic solvent to be formed into a coating solution. The solvent soluble fluororesin can be obtained by causing a fluorine-containing polymerizable compound and other polymerizable compounds or polymerizable compounds having a hydroxyl group to react with each other in the same manner as in the method (i) described above.

Commercially-available items can also be used as the solvent soluble fluororesin. Examples of the commercially-available items of the solvent soluble fluororesin include, for example, "Cefral Coat" series (PX-40, A202B, A606X, and CF803, all Trade Names, manufactured by Central Glass Co., Ltd.), "LUMIFLON" series (LF-100, LF-200, LF-302, LF-400, LF-554, LF-600, and LF-986N, all Trade Names, manufactured by Asahi Glass Co., Ltd.), "ZAFLON" series (FC-110, FC-220, FC-250, FC-275, FC-310, FC-575, and XFC-973, all Trade Names, manufactured by Toagosei Co., Ltd.), "ZEFFLE GK-510" (Trade Name, manufactured by Daikin Industries, LTD.), and "FLUONATE" series (Trade Name, manufactured by Dainippon Ink and Chemicals, Incorporated).

The solvent soluble fluororesins having a hydroxyl group can be used alone or as a mixture of two or more kinds thereof.

The solvent soluble fluororesin has a hydroxyl group in the molecule. Therefore, a radical polymerizable group can be introduced into the molecule by causing a polymerizable compound having both an organic group capable of reacting with such a hydroxyl group and a radical polymerizable group to react therewith. Examples of the organic group capable of reacting with a hydroxyl group include an isocyanate group, a carboxyl group, a hydroxyl group, an aldehyde group, and an epoxy group, for example. Among the above, the isocyanate group is suitable because the isocyanate group has high reactivity and easily reacts. Examples of the radical polymerizable group include a vinyl group, an allyl group, and a (meth)acryloyl group, for example.

Specific examples of the polymerizable compound having both an organic group capable of reacting with a hydroxyl group and a radical polymerizable group include methacryloyl isocyanate, 2-isocyanatoethyl methacrylate, allyl isocyanate, m-, or p-isopropenyl-α,α-dimethylbenzyl isocyanate, for example. These compounds can be used alone or as a mixture of two or more kinds thereof.

In the urethane resin obtained by the polymerization reaction (ii) described above, the constituent unit represented by Formula (3) shown above is present in a branched chain branched from the fluororesin frame of the structure of the silicone graft fluororesin, unlike the method (i) described above.

Polyol

As polyol, those having at least one structure selected from (A101) to (A104) shown above are used.

Polyol having the (A101) structure is suitably polyether polyol having the specific structure described above and particularly suitably polyether diol obtained by performing ring opening copolymerization of tetrahydrofuran and 3-methyl-tetrahydrofuran. The number average molecular weight of the polyol having the (A101) structure is suitably 500 or more and 5000 or less and particularly suitably 1000 or more and 3000 or less. Examples of the polyol having the (A101) structure include "PTG-L1000" and "PTG-L3000" manufactured by HODOGAYA CHEMICAL CO., LTD.

Polyol having the (A102) structure is suitably polybutadiene diol or polyisoprene diol. The number average molecular weight of the polyol having the (A102) structure is suitably 1000 or more and 5000 or less and particularly suitably 1000 or more and 4000 or less. Examples of the polyol having the (A102) structure include "Poly ip" and "Poly bd" manufactured by Idemitsu Kosan and "G-1000", "G-2000", and "G-3000" manufactured by Nippon Soda Co., Ltd.

Polyol having the (A103) structure is suitably polycarbonate diol derived from 1,9-nonanediol. The number average molecular weight of the polyol having the (A103) structure is suitably 500 or more and 5000 or less and particularly suitably 1000 or more and 3000 or less. Examples of the polyol having the (A103) structure include "Kuraray polyol C1090", "Kuraray polyol C2090", and "Kuraray polyol C3090" manufactured by Kuraray Co., Ltd.

Polyol having the (A104) structure is suitably polyester diol derived from azelaic acid or sebacic acid. The number average molecular weight of the polyol having the (A104) structure is suitably 1000 or more and 5000 or less and particularly suitably 2000 or more and 4000 or less. Examples of the polyol having the (A104) structure include "URIC SE-2606" and "URIC SE-3506" manufactured by ITOH OIL CHEMICALS CO., LTD.

As the polyol, polyol not having any structures of (A101) to (A104) may be used in combination as necessary insofar as the effects disclosed herein are not impaired. As such polyol, the following substances are specifically mentioned; polyether polyols, such as polypropylene glycol, ethylene glycol, and tetraethyl glycol; and aliphatic polyester polyols obtained by a condensation reaction between diol components, such as 1,4-butanediol, 3-methyl-1.5-pentanediol, and neopentyl glycol or triol components, such as trimethylolpropane, and dicarboxylic acids, such as glutaric acid, adipic acid, and sebacic acid.

The polyols not having any structures of (A101) to (A104) may be prepolymers subjected to chain extension beforehand as necessary with isocyanates, such as 2,4-tolylene diisocyanate (TDI), 1,4 diphenylmethane diisocyanate (MDI), and isophorone diisocyanate (IPDI). Further, as the polyol, polyol having at least one structure selected from (A101) to (A104) and the prepolymers may be used in combination.

Isocyanate Compound

The isocyanate compound reacts with the hydroxyl group in the hydroxyl group-containing silicone graft fluororesin and the polyol having the specific structure described above to form a urethane bond, and then cross-links the same.

As the isocyanate compound, known diisocyanates having two or more isocyanate groups can be suitably used and the isocyanate compound is not particularly limited. Specifically, the following substances are suitably used; aliphatic polyisocyanates, such as ethylene diisocyanate and 1,6-hexamethylene diisocyanate (HDI); alicyclic polyisocyanates, such as isophorone diisocyanate (IPDI), cyclohexane 1,3-diisocyanate, and cyclohexane 1,4-diisocyanate; and aromatic isocyanates, such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate, and naphthalene diisocyanate.

The isocyanate compounds may also be formed into prepolymers subjected to chain extension with polyols beforehand. In this case, the isocyanate content in the prepolymers is suitably in the range of 3.0% by mass or more and 5.0% by mass or less.

The isocyanate compound is suitably mixed in such a manner that the ratio of the number of the isocyanate groups to the total of the number of the hydroxyl groups of the hydroxyl group-containing silicone graft fluororesin and the number of the hydroxyl groups of the polyol (hereinafter referred to as "NCO group/OH group ratio") is in the range of 1.0 or more and 2.0 or less.

Figure 5:
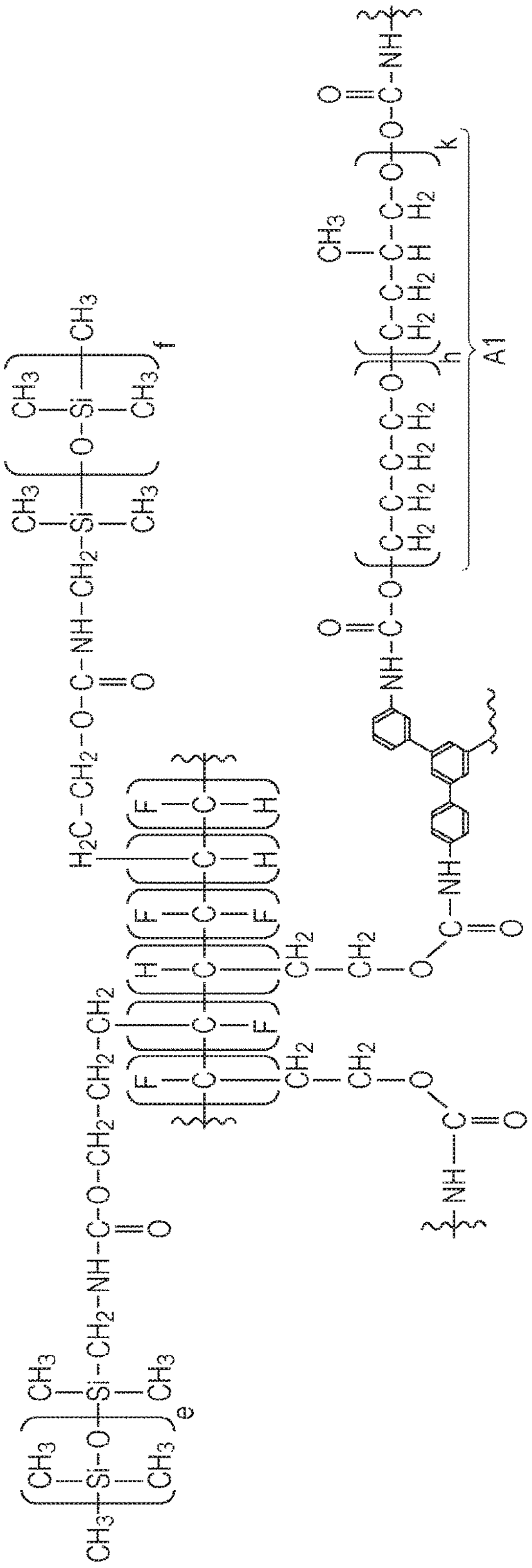
FIG. 5 is a structural formula of a part of the structure of an example of urethane resin in an electro-conductive resin layer.

FIG. 5 shows the structural formula of a part of the structure of an example of urethane resin. The urethane resin is obtained by cross-linking the hydroxyl group-containing silicone graft fluororesin and the polyols having the structures represented by Formula (A102a) and Formula (A102c) with polymeric MDI. In FIG. 5, the urethane resin has the constituent units represented by Formula (2) and Formula (3). The portion corresponding to A1 in Formula (1) has the structures represented by Formula (A102a) and Formula (A102c) and is sandwiched between the adjacent urethane bonds. In FIG. 5, e, f, h, and k each independently represent a positive integer.

Other Components in Resin

To the electro-conductive resin layer 14, a filler, a conducting agent, a softener, a processing aid, an adhesion imparting agent, a surface tack eliminator, and a foaming agent, which are generally used as compounding agents of resin, can be added insofar as the purposes of compounding the compounding agents are achieved and the effects disclosed herein are not impaired.

As the conducting agent, carbon black; electro-conductive metals, such as aluminum and copper;

fine particles of electro-conductive metal oxides, such as zinc oxide, tin oxide, and titanium oxide;

ion conductive agents, such as quaternary ammonium salt, borate salt, perchlorate, and ionic liquid, can be used.

Among the above, the carbon black and the ion conductive agents are particularly suitable because the carbon black and the ion conductive agents can prevent resistance changes when printing in large quantities is repeatedly performed in a high temperature and high humidity environment.

When the carbon black is used as the conducting agent, the content of the carbon black is suitably 10 parts by mass or more and 30 parts by mass or less based on 100 parts by mass of the solid content of resin forming the electro-conductive resin layer 14 from the viewpoint of hardness, dispersibility, and electro-conductivity. When the ion conductive agent is used as the conducting agent, the content of the ion conductive agent is suitably 0.1 part by mass or more and 10 parts by mass or less based on 100 parts by mass of the resin solid content from the viewpoint of bleed out and electro-conductivity.

Into the electro-conductive resin layer 14, various additives, such as a non-conductive filler, a crosslinking agent, and a catalyst, can be compounded as appropriate insofar as the purposes of compounding the compounding agents are achieved and the effects disclosed herein are not impaired as in the elastic layer 13 described above. As specific examples of these additives, the same additives mentioned as the additives for the elastic layers 13 can also be used.

In order to adjust the surface roughness of the member for electrophotography, roughness controlling fine particles may be added to the electro-conductive resin layer 14. The volume average particle diameter of the roughness controlling fine particles is suitably 3 μm or more and 20 μm or less. The addition amount of the roughness controlling fine particles to be added to the electro-conductive resin layer 14 is suitably 1 part by mass or more and 50 parts by mass or less based on 100 parts by mass of the resin solid content of the electro-conductive resin layer 14. As the roughness controlling fine particles, fine particles of polyurethane resin, polyester resin, polyether resin, polyamide resin, acrylic resin, and phenol resin can be used.

Intermediate Layer

The intermediate layer 15 is an electro-conductive resin layer. As a binder resin forming the intermediate layer 15, known resin can be used and the binder resin is not particularly limited. As the binder resin, the following substances are mentioned, for example and these substances may be used alone or in combination of two or more kinds thereof. Mentioned are urethane resin, epoxy resin, urea resin, ester resin, amide resin, imide resin, amide imide resin, phenol resin, vinyl resin, silicone resin, and fluororesin.

Among the above, the urethane resin is particularly suitable from the viewpoint of wear resistance and flexibility.

Second Embodiment

An electro-conductive blade is mentioned as an example of a member for electrophotography.

Figure 2:
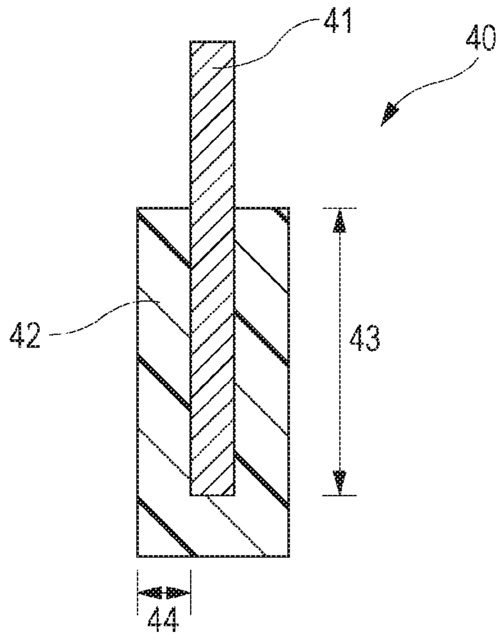
FIG. 2 is a cross-sectional view of an example of an electro-conductive blade according to one example embodiment.

FIG. 2 is a cross-sectional view along the direction orthogonal to the longitudinal direction of an example of an electro-conductive blade.

An electro-conductive blade 40 contains an electro-conductive support base material (base) 41 and an electro-conductive resin layer 42 provided on the periphery of the electro-conductive support base material 41. The support base material 41 has a blade shape and functions as an electrode and a support member of the electro-conductive blade. The support base material 41 contains metals, such as aluminum and copper; alloys, such as stainless steel, iron subjected to plating treatment with chromium or nickel, and conductive materials, such as synthetic resin having electro-conductivity.

The electro-conductive resin layer 42 is the same as the electro-conductive resin layer 14 of the first embodiment. The electro-conductive resin layer 42 can be formed by applying a coating solution produced in the same manner as in the formation method of the electro-conductive resin layer 14 by spray coating or dip coating, drying the same, and then curing a coating film by heating. The thickness of the electro-conductive resin layer 42 is suitably 1.0 μm or more and 50 μm or less and particularly suitably 5 μm or more and 30 μm or less.

Electrophotographic Apparatus

The member for electrophotography described above can be suitably used as an electro-conductive roller, such as a developing roller, a transfer roller, a charging roller, and a developer supplying roller, and an electro-conductive blade, such as a cleaning blade and a developing blade, of an electrophotographic apparatus. In particular, the member for electrophotography can be suitably used as a developing roller, a charging roller, or a developing blade.

Figure 3:
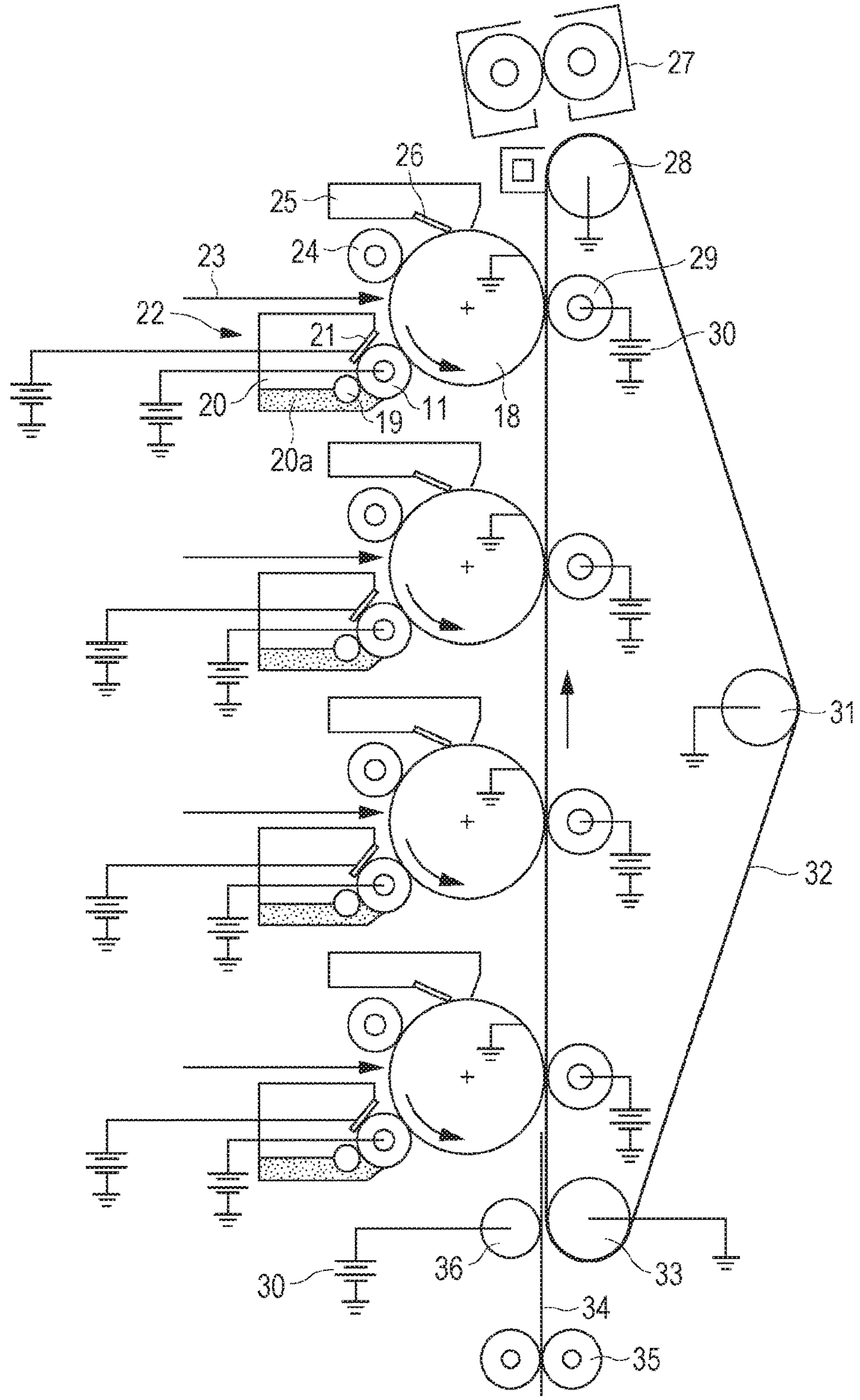
FIG. 3 is a schematic configuration view of an example of an electrophotographic apparatus according to one example embodiment.

FIG. 3 is a cross-sectional view of an example of an electrophotographic apparatus and has the member for electrophotography described above as a developing roller. To the electrophotographic apparatus illustrated in FIG. 3, a developing apparatus 22 containing a developing roller 11 (electro-conductive roller), a toner supplying roller 19, a toner container 20, and a developing blade 21 is detachably attached. The developing roller 11 is located in an opening portion extending in the longitudinal direction in the toner container 20 and is disposed facing a photoconductor 18. The toner container 20 accommodates a toner **20*a* as a one-component developer. The toner 20*a* is supplied to the surface of the developing roller 11 by the toner supplying roller 19, and then a toner layer having a predetermined thickness is formed on the surface of the developing roller 11 with the developing blade 21. Moreover, a process cartridge 17 shown in FIG. 4, which contains a photoconductor 18, a cleaning blade 26, a waste toner accommodating container 25, and a charging roller 24 is detachably attached to the electrophotographic apparatus. The photoconductor 18, the cleaning blade 26, the waste toner accommodating container 25, and the charging roller 24** may be disposed in the main body of the electrophotographic apparatus.

The photoconductor 18 rotates in the direction indicated by the arrow in FIG. 3 and is uniformly charged by the charging roller 24, so that an electrostatic latent image is formed on the surface of the photoconductor 18 by laser light 23. The electrostatic latent image is developed by the toner 20*a* given by the developing apparatus 22 disposed in contact with the photoconductor 18 to be visualized as a toner image. A development method is so-called reversal development, by which a toner image is formed in an exposure portion. The toner image on the photoconductor 18 is transferred to paper 34 which is a recording medium with the transfer roller 29 which is a transfer member. The paper 34 is fed onto an endless belt-shaped transfer conveying belt 32 through a paper feeding roller 35 and an absorbing roller 36. The paper 34 is conveyed between the photoconductor 18 and the transfer roller 29 by the transfer conveying belt 32. The transfer conveying belt 32 works by a driven roller 33, a driving roller 28, and a tension roller 31. A voltage is applied to the transfer roller 29 and the absorbing roller 36 from a bias power supply 30. The paper 34 to which the toner image is transferred is subjected to fixing treatment by a fixing apparatus 27, and then discharged to the outside of the apparatus to complete the print operation. On the other hand, untransferred toner remaining on the photoconductor 18 without being transferred is scraped by the cleaning blade 26 which is a cleaning member for cleaning the surface of the photoconductor 18, and then accommodated in the waste toner accommodating container 25. The cleaned photoconductor 18 repeatedly performs the above-described action.

Process Cartridge

Figure 4:
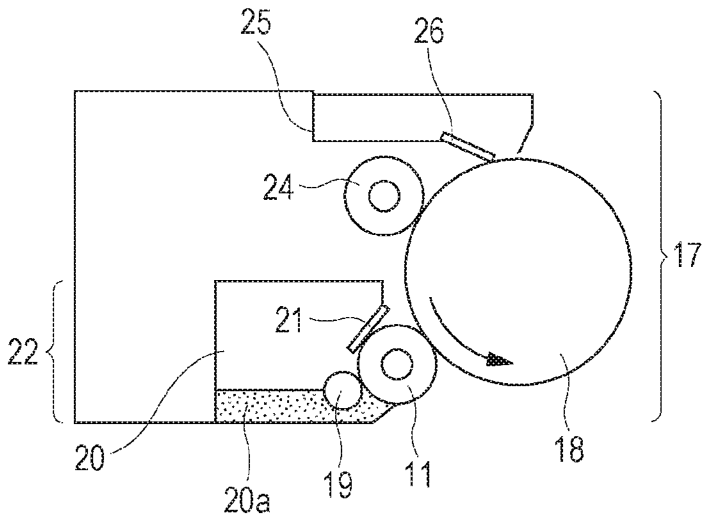
FIG. 4 is a schematic configuration view of an example of a process cartridge according to one example embodiment.

FIG. 4 is a cross-sectional view of an example of a process cartridge. The process cartridge 17 is configured so that the developing apparatus 22, the photoconductor 18, the cleaning blade 26, the waste toner accommodating container 25, and the charging roller 24 are integrated and configured so as to be detachably attached to the main body of the electrophotographic image forming apparatus. The developing apparatus 22 contains the developing roller 11, the developing blade 21, the toner supplying roller 19, and the toner container 20 and has the electro-conductive roller described above as the developing roller 11. The toner container 20 in the developing apparatus 22 is filled with the toner 20*a*. The developing apparatus 22 may be detachable and attachable.

One aspect of the present disclosure can provide a member for electrophotography which has toner filming resistance and is difficult to cause plastic deformation, even when a load is applied thereto over a long period of time in a high temperature and high humidity environment. Another aspect of the present disclosure can provide a process cartridge and an electrophotographic apparatus capable of stably forming a high grade electrophotographic image even in a high temperature and high humidity environment.

EXAMPLES

Hereinafter, one aspect of the present disclosure is described with reference to specific Examples and Comparative Examples.

Synthesis of Hydroxyl Group-containing Silicone Graft Fluororesin L-1

First, "LUMIFLON LF-200" (manufactured by Asahi Glass Co., Ltd.) was prepared as a soluble fluororesin, and then a vinyl group as a radical polymerization group was introduced thereinto. In a glass reactor having a mechanical stirring device, a thermometer, a capacitor, and a dry nitrogen gas introduction port, 100.0 g of "LUMIFLON LF-200" (manufactured by Asahi Glass Co., Ltd.) was dissolved in 100.0 g of methyl ethyl ketone (hereinafter referred to as MEK) under a dry nitrogen atmosphere.

Then, a solution in which 1.7 g (0.02 mol) of allyl isocyanate (manufactured by Sigma Aldrich) was dissolved in 5 g of MEK was gradually added dropwise while holding the temperature in the reactor at 80° C. After the completion of the dropwise addition, the resultant solution was caused to react at a temperature of 80° C. for 2 hours to cause a hydroxyl group in the side chain of the "LUMIFLON LF-200" and the isocyanate group of the allyl isocyanate to react with each other. The obtained reaction mixture was cooled to room temperature. Thus, 73.1 g of a solvent soluble fluororesin F-1 having a vinyl group was obtained.

Next, a polymerizable compound having a siloxane structure in the side chain was synthesized. 0.5 g of trimethyl silanol (manufactured by Tokyo Kasei Kogyo Co., Ltd.) was poured into a glass reactor having a mechanical stirring device and a dropping funnel, and then stirred in an ice bath. Subsequently, 3.6 ml of a hexane solution of n-butyl lithium (1.6 mol/L) (manufactured by Tokyo Kasei Kogyo Co., Ltd.) was added dropwise. After the completion of the dropwise addition, the resultant mixture was stirred in an ice bath for 1 hour, and then a solution in which 24.66 g of hexamethylcyclotrisiloxane (manufactured by Tokyo Kasei Kogyo Co., Ltd.) was dissolved in 25 g of THF was gradually added dropwise. After the completion of the dropwise addition, the ice bath was removed, the resultant mixture was stirred for 6 hours, 1.0 g of chlorodimethylvinylsilane (manufactured by Tokyo Kasei Kogyo Co., Ltd.) was added dropwise to the resultant mixture, and then the resultant mixture was further stirred for 12 hours. Then, 10% by mass of a sodium hydrogencarbonate aqueous solution was added to the obtained reaction solution, and then an aqueous layer was removed to obtain an organic layer. The organic layer was washed with pure water, and then dehydrated with magnesium sulfate (manufactured by UMAI CHEMICAL CO., LTD.). Then, a volatilization component was removed under the conditions of 50° C./10 mmHg. Thus, 25.0 g of terminal vinyl-modified dimethyl polysiloxane S-1 having a vinyl group in one terminal of dimethyl siloxane was obtained.

The number average molecular weight (Mn) of the obtained terminal vinyl-modified dimethylpolysiloxane S-1 was measured by the following measuring apparatus under the following measurement conditions.

Measurement apparatus: HLC-8120GPC (Trade Name, manufactured by TOSOH CORP.)

Column: TSKgel SuperHZMM (Trade Name, TOSOH CORP.)×2

Solvent: Toluene

Temperature: 40° C.

Flow velocity: 0.6 ml/min

As the measurement sample, 0.1% by mass of a toluene solution was used. Furthermore, the measurement was performed using an RI (refractive index) detector as a detector. The calibration curve was created using TSK standard polystyrene (Trade Names "A-1000", "A-2500", "A-5000", "F-1", "F-2", "F-4", "F-10", "F-20", "F-40", "F-80", and "F-128", manufactured by TOSOH CORP.) as reference samples for creating the calibration curve. Based on the calibration curve, the number average molecular weight was determined from the retention time of the obtained measurement sample.

The number average molecular weight of the terminal vinyl-modified dimethylpolysiloxane S-1 was 15000.

Next, in a glass reactor having a mechanical stirring device, a thermometer, a capacitor, and a dry nitrogen gas introduction port, 20.0 g of solvent soluble fluororesin F-1 having a vinyl group, 18.3 g of xylene, 15.2 g of n-butyl acetate, 2.1 g of methyl methacrylate (manufactured by Mitsubishi Gas Chemical Co., Inc.), 1.6 g of n-butyl methacrylate (Product Name "LIGHT ESTER NB", manufactured by Kyoeisha Chemical Co., Ltd.), 1.6 g of lauryl methacrylate (Product Name "LIGHT ESTER L", manufactured by Kyoeisha Chemical Co., Ltd.), 1.6 g of 2 hydroxyethyl methacrylate (Product Name "LIGHT ESTER HO-250 (N)", manufactured by Kyoeisha Chemical Co., Ltd.), 4.8 g of terminal vinyl-modified dimethyl polysiloxane S-1, and 0.1 g of a radical polymerization initiator (Product Name "Perbutyl O", manufactured by Nippon Oil & Fats Co., Ltd.) were placed, and then were caused to react with each other at a temperature of 90° C. under nitrogen atmosphere for 4 hours. The obtained reaction mixture was cooled to room temperature. Thus, the vinyl group of F-1, S-1, and methacrylate were caused to react with each other, whereby 31 g of hydroxyl group-containing silicone graft fluororesin L-1 was obtained. L-1 has the constituent unit represented by Formula (3) in the branched chain branched from the main chain of the fluororesin frame.

The number average molecular weight (Mn) of the obtained hydroxyl group-containing silicone graft fluororesin L-1 was measured by the following measuring apparatus under the following measurement conditions.

Measurement apparatus: HLC-8120GPC (Trade Name, manufactured by TOSOH CORP.)

Column: TSKgel SuperHZMM (Trade Name, TOSOH CORP.)×2

Solvent: Tetrahydrofuran (THF)

Temperature: 40° C.

Flow velocity: 0.6 ml/min

As the measurement sample, 0.1% by mass of a THF solution was used. Furthermore, the measurement was performed using an RI (refractive index) detector as a detector. The calibration curve was created using TSK standard polystyrene (Trade Names "A-1000", "A-2500", "A-5000", "F-1", "F-2", "F-4", "F-10", "F-20", "F-40", "F-80", and "F-128", manufactured by TOSOH CORP.) as reference samples for creating the calibration curve. Based on the calibration curve, the number average molecular weight was determined from the retention time of the obtained measurement sample.

The number average molecular weight of the hydroxyl group-containing silicone graft fluororesin L-1 was 20000.

Synthesis of Hydroxyl Group-containing Silicone Graft Fluororesins L-2 to L-4

Hydroxyl group-containing silicone graft fluororesins L-2 to L-4 were synthesized in the same manner as in L-1, except changing the compounding amount and the reaction time as shown in the following table 1.

Synthesis of Hydroxyl Group-containing Silicone Graft Fluororesin L-5

Terminal vinyl-modified dimethylpolysiloxane S-2 was synthesized in the same manner as in S-1, except changing the amount of the hexamethylcyclotrisiloxane (manufactured by Tokyo Kasei Kogyo Co., Ltd.) to 13.12 g and changing the stirring time after the completion of the dropwise addition to 4 hours. The number average molecular weight of the terminal vinyl-modified dimethylpolysiloxane S-2 was 8000.

Hydroxyl group-containing silicone graft fluororesin L-5 was synthesized in the same manner as in L-1, except using the terminal vinyl-modified dimethylpolysiloxane S-2 and changing the compounding amount and the reaction time as shown in the following table 1.

Synthesis of Hydroxyl Group-containing Silicone Graft Fluororesins L-6 to L-7

A soluble fluororesin F-2 having a methacryloyl group as a radical polymerizable group was synthesized in the same manner as in F-1, except using a solution in which 3.1 g (0.02 mol) of 2-isocyanateethyl methacrylate (manufactured by Tokyo Kasei Kogyo Co., Ltd.) was dissolved in 9.0 g of MEK in place of the MEK solution of allyl isocyanate.

Hydroxyl group-containing silicone graft fluororesins L-6 to L-7 were synthesized in the same manner as in L-1, except using the soluble fluororesin F-2 and changing the compounding amount and the reaction time as shown in the following table 1.

TABLE 1

| | Hydroxyl group-containing silicone graft fluororesin | | | | | | |
|---|---|---|---|---|---|---|---|
| | L-1 | L-2 | L-3 | L-4 | L-5 | L-6 | L-7 |
| Solvent soluble fluororesin | F-1 | F-1 | F-1 | F-1 | F-1 | F-2 | F-2 |
| Content (g) | 20.0 | 41.3 | 15.3 | 13.0 | 20.0 | 29.0 | 34.2 |
| Terminal vinyl-modified polydimethylsiloxane | S-1 (Mn = 15000) | S-1 | S-1 | S-1 | S-2 (Mn = 8000) | S-1 | S-1 |
| Content (g) | 4.8 | 8.5 | 3.3 | 2.8 | 3.1 | 5.2 | 7.1 |
| Methylmethacrylate (g) | 2.1 | 4.1 | 1.7 | 1.5 | 2.1 | 2.3 | 3.5 |
| LIGHT ESTER NB (g) | 1.6 | 3.2 | 1.3 | 1.0 | 1.6 | 1.7 | 2.8 |
| LIGHT ESTER L (g) | 1.6 | 3.2 | 1.3 | 1.0 | 1.6 | 1.7 | 2.8 |
| LIGHT ESTER HO-250 (N) (g) | 1.6 | 3.2 | 1.3 | 1.0 | 1.6 | 1.7 | 2.8 |
| Reaction time (h) | 4.0 | 11.0 | 3.0 | 2.0 | 4.0 | 4.0 | 6.0 |
| Number average molecular weight of hydroxyl group-containing silicone graft fluororesin (Mn) | 20000 | 50000 | 12000 | 10000 | 20000 | 20000 | 30000 |

Synthesis of Hydroxyl Group-containing Silicone Graft Fluororesin L-8

In a stainless steel pressure-resistant reactor having a stirrer, 400 g of xylene, 10.0 g of ethylvinylether (manufactured by Maruzen Petrochemical), 20.0 g of 4-hydroxybutylvinylether (manufactured by Maruzen Petrochemical), 35.0 g of methacryl-modified dimethyl polysiloxane (Product Name "X22-174DX", manufactured by Shin-Etsu Chemical Co., Ltd.), and 6.0 g of calcium carbonate were placed, and then dissolved oxygen in the solution was removed by solidification and degassing with liquid nitrogen. Next, 30.0 g of chlorotrifluoroethylene (manufactured by Aldrich) was introduced, the temperature was gradually increased, and then a polymerization reaction was performed while maintaining the temperature at 65° C. 10 hours later, the reactor was cooled with water to reduce the temperature of the reaction liquid to room temperature. Thereafter, unreacted monomers were purged, and further the obtained reaction liquid was filtered with diatomite to remove a non-dissolved solid. Thus, 62.2 g of hydroxyl group-containing silicone graft fluororesin L-8 having a structure in which dimethyl polysiloxane was bonded to fluororesin through an ester bond was obtained. The number average molecular weight of L-8 was 24000 as measured in the same manner as in L-1.

Synthesis of Hydroxyl Group-containing Silicone Graft Fluororesin L-9

In a glass reactor having a mechanical stirring device and a thermometer, 10.9 g of 1,1,2-trifluoropenta-1,4-diene (manufactured by FCH Group), 100.0 g of xylene, 50.0 g of acetic anhydride, and 19.5 g of chloromethyl pentaethyl disiloxane (manufactured by Gelest) were placed, and then caused to react with each other at a temperature of 40° C. for 3 hours. The obtained reaction solution was cleaned with pure water to obtain 21.3 g of a fluorine-containing polymerizable compound E-1 in which disiloxane was bonded to the side chain.

Hydroxyl group-containing silicone graft fluororesin L-9 was synthesized in the same manner as in L-8, except using 8.7 g of the fluorine-containing polymerizable compound E-1 in place of the methacryl-modified dimethyl polysiloxane. When the number average molecular weight of L-8 was measured in the same manner as in L-1, the number average molecular weight of L-9 was 30000.

Synthesis of Polyol

Materials shown in the following table 2 were prepared as polyol.

TABLE 2

| | Polyol | Structure |
|---|---|---|
| P-1 | P-1 | (A101) |
| P-2 | Polyether polyol (Trade Name "PTG-L3000", manufactured by HODOGAYA CHEMICAL CO., LTD.) | (A101) |
| P-3 | Polyether polyol (Trade Name "PTG-L1000", manufactured by HODOGAYA CHEMICAL CO., LTD.) | (A101) |
| P-4 | Polyisoprene diol (Trade Name "Poly ip", manufactured by IDEMITSU KOSAN CO., LTD.) | (A102) |
| P-5 | Polybutadiene diol (Trade Name "Poly bd", manufactured by IDEMITSU KOSAN CO., LTD.) | (A102) |
| P-6 | Polybutadiene diol (Trade Name "G-3000", manufactured by Nippon Soda Co., Ltd.) | (A102) |
| P-7 | Polybutadiene diol (Trade Name "G-1000", manufactured by Nippon Soda Co., Ltd.) | (A102) |
| P-8 | Polycarbonate diol (Trade Name "Kuraray polyol C1090" manufactured by Kuraray Co., Ltd.) | (A103) |
| P-9 | Polycarbonate diol (Trade Name "Kuraray polyol C3090" manufactured by Kuraray Co., Ltd.) | (A103) |
| P-10 | Sebacic acid-based polyester polyol (Trade Name "URIC SE-2606" manufactured by ITOH OIL CHEMICALS CO., LTD.) | (A104) |

TABLE 2-continued

| | Polyol | Structure |
|---|---|---|
| P-11 | Polypropylene glycol (Trade Name "EXCENOL 1020", manufactured by Asahi Glass Co., Ltd.) | — |
| P-12 | Polytetramethylene glycol (Trade Name "PTMG 3000", manufactured by Mitsubishi Chemical Corporation) | — |
| P-13 | Butylene adipate (Trade Name "NIPPOLLAN 4010", manufactured by TOSOH CORP.) | — |

The polyol P-1 was synthesized as follows. In a glass reactor, a mixture of 461.4 g of dry tetrahydrofuran and 137.8 g of dry 3-methyltetrahydrofuran was held at a temperature of 10° C. Subsequently, 26.2 g of 70% perchloric acid and 240 g acetic anhydride were added, and then were caused to react with each other under stirring for 4 hours. The obtained reaction mixture was poured into 1000 g of a 20% sodium hydroxide aqueous solution. The pressure was further reduced to remove the remaining water and the solvent component to obtain a 498 g of liquid polyether diol P-1. When the number average molecular weight was measured in the same manner as in L-1, the number average molecular weight of P-1 was 5000.

Synthesis of Isocyanate Group Terminal Prepolymer

In a glass reactor, 200.0 g of the polyol P-2 was gradually added dropwise to 80.0 g of polymeric MDI (Trade Name, "COSMONATE MDI", manufactured by Mitsui Chemicals, Inc.) while holding the temperature in the reaction solution at 65° C. under a nitrogen atmosphere. After the completion of the dropwise addition, the resultant mixture was caused to react at a temperature of 65° C. for 2 hours. The obtained reaction mixture was cooled to room temperature to obtain 220.5 g of isocyanate group terminal urethane polymer B-1.

Isocyanate group terminal prepolymers B-2 to B-5 were synthesized in the same manner as in B-1, except changing the type and the compounding amount of polyols as shown in the following table 3.

TABLE 3

| Isocyanate group terminal prepolymer | Polyol | Compounding amount (g) | Structure |
|---|---|---|---|
| B-1 | P-2 | 200.0 | (A101) |
| B-2 | P-4 | 220.0 | (A102) |
| B-3 | P-5 | 235.0 | (A102) |
| B-4 | P-9 | 570.0 | (A103) |
| B-5 | P-10 | 550.0 | (A104) |

Electro-conductive Roller

Example 1

Production of Elastic Roller D-1

A primer (Trade Name "DY35-051", manufactured by Toray Industries Dow Corning) was applied to a stainless steel (SUS304) core metal with a diameter of 6 mm, and then baked for 20 minutes in an oven heated to a temperature of 180° C. to be used as a base.

Materials shown in the following table 4 were dispersed as liquid materials for forming an elastic layer. The base was disposed in a die, the shape material was charged into a cavity formed in the die, and then the die was heated for 20 minutes in an oven heated to a temperature of 140° C. to cure the same. After cooling the die, a mandrel on which a silicone rubber layer was formed was released from the die, and then heated for 3 hours in an oven heated to a temperature of 190° C. to complete the curing reaction of the silicone rubber layer. Thus, an elastic roller D-1 having a silicone rubber elastic layer with a diameter of 12 mm formed on the periphery of the base was produced.

TABLE 4

| Material name | Compounding amount |
|---|---|
| Liquid silicone rubber material (Trade Name, SE6905A/B; manufactured by Toray Industries Dow Corning) | 100 parts by mass |
| Carbon black (Trade Name, TOKABLACK #4300; manufactured by Tokai Carbon Co., Ltd.) | 15 parts by mass |

Formation of Electro-conductive Resin Layer

As materials of an electro-conductive resin layer, 69.5 parts by mass of the polyol P-1, 53.5 parts by mass of the isocyanate group terminal prepolymer B-1, 1 part by mass of the hydroxyl group-containing silicone graft fluororesin L-1, 32.0 parts by mass of carbon black (Trade Name "MA230", manufactured by Mitsubishi Chemical Corporation), and 10.0 parts by mass of urethane resin particles (Trade Name, "Art Pearl C-800", manufactured by Negami Chemical Industrial CO., Ltd.) were stirred and mixed.

Next, methyl ethyl ketone was added so that the total solid content ratio was 30% by mass, and then mixed with a sand mill. Subsequently, further, the viscosity was adjusted to 10 to 12 cps with methyl ethyl ketone to prepare a coating solution for forming an electro-conductive resin layer.

The elastic roller D-1 produced above was dipped in the coating solution to form a coating film of the coating solution on the surface of the elastic layer of the elastic roller D-1, and then dried. Furthermore, an electro-conductive resin layer with a film thickness of 15 μm was provided on the periphery of the elastic layer by heat-treating the same at a temperature of 150° C. for 1 hour to produce a developing roller according to Example 1.

The developing roller according to Example 1 thus obtained were evaluated for the following items. The evaluation results as a developing roller are shown in Table 6.

Measurement of Amount of Deformation and Evaluation of Image

A black toner cartridge for a laser beam printer (Trade Name "LBP7700C", manufactured by CANON KABUSHIKI KAISHA) having the configuration of FIG. 3 was prepared. To a toner container of the process cartridge, a developing blade and the developing roller according to Example 1 were attached, and then the process cartridge was allowed to stand still for 60 days in an environment of a temperature of 40° C. and a relative humidity of 95% RH (hereinafter referred to as a severe environment) in a state where the developing roller and the developing blade were in contact with each other. The contact pressure of the developing roller and the developing blade was adjusted to 0.6 N/cm on average, and the setting was changed to severer setting to plastic deformation. Thereafter, the process cartridge was allowed to stand still in an environment of a temperature of 23° C. and a relative humidity of 55% RH for 6 hours, and then loaded into the laser beam printer. Then, halftone images were output, and then the halftone images were evaluated according to the following criteria.

A: Uneven density is not observed.
B: Slight transverse streaks are randomly generated.
C: Pale transverse streaks are generated at the rotation cycle of the developing roller.
D: Clear transverse streaks are generated at the rotation cycle of the developing roller.

The evaluated developing roller was removed from the process cartridge, and then the amount of deformation (μm) of the developing roller was measured as follows.

The toner on the surface of the developing roller was removed by air blow, and then the base material of the developing roller was fixed in a state where the developing roller was rotatable. A laser displacement sensor (Trade Name "LT-9500V", manufactured by KEYENCE CORP.) was placed so that laser was vertically applied to the surface of the developing roller. The developing roller was rotated and driven at an arbitrary number of rotations, the maximum value and the minimum value of the displacement in the circumferential direction of the surface of the developing roller were read, and then a difference therebetween was determined. The measurement was performed at the center in the longitudinal direction of the developing roller and two points with a 43 mm pitch in the longitudinal direction from the center to both ends, i.e., five points in total, and then the average value of the values at the five points was determined as the amount of deformation.

Measurement of Toner Stick Density

The evaluation of the toner stick density in the severe environment was performed by the following method.

The developing roller according to Example 1 was attached to a yellow toner cartridge for a laser beam printer (Trade Name "LBP7700C", manufactured by CANON KABUSHIKI KAISHA) having the configuration of FIG. 3. The yellow toner cartridge was loaded to the laser beam printer. Then, an output operation of a white solid image (image in which nothing was drawn on the sheet) was performed using the laser beam printer to form a state where the surface of the developing roller was coated with the yellow toner. The developing roller in such a state was removed from the yellow toner cartridge. The developing roller was placed on a polytetrafluoroethylene flat plate, the developing roller was brought into pressure contact with the flat plate with a 2.94 N load (1.47 N load to each of both ends of the mandrel), and then the developing roller was allowed to stand for 60 days in the severe environment. Subsequently, the developing roller was released from the pressure contact state to the flat plate, the developing roller was allowed to stand still in an environment of a temperature of 25° C. and a relative humidity of 45% RH for 3 hours, and then the surface of a developing roller was subjected to air blow.

Subsequently, the toner sticking onto the developing roller was separated using an adhesive tape (Trade Name, "Mending tape", manufactured by Sumitomo 3M Ltd.). The adhesive tape to which the yellow toner stuck was placed on a plain paper (Trade Name "office 70", manufactured by CANON KABUSHIKI KAISHA), and then the reflection density was measured using a reflection densitometer (Trade Name "TC-6 DS/A", manufactured by Tokyo Denshoku. Co., Ltd.).

As a contrast, an adhesive tape to which no toner stuck was similarly placed on a plain paper, and then the reflection density was similarly measured. Then, the density difference between the reflection density of the adhesive tape to which no toner stuck and the reflection density of the adhesive tape to which the yellow toner stuck was determined. Furthermore, the ratio of the density difference when the reflection density of the adhesive tape to which no toner stuck was set to 100 was determined to be used as the reflectance reduction amount (%). This measurement was performed at three points in total of a central part and both end portions of the developing roller, and then the arithmetic mean value was used as the toner stick density of the developing roller as the evaluation target.

Evaluation of Filming Resistance

To a magenta toner cartridge for a laser beam printer (Trade Name "LBP7700C", manufactured by CANON KABUSHIKI KAISHA) having the configuration of FIG. 3, the developing roller according to Example 1 was attached. The magenta toner cartridge was attached to the laser beam printer. Then, the laser beam printer was allowed to stand in an environment of a temperature of 10° C. and a relative humidity of 10% RH (hereinafter referred to as an L/L environment) for 24 hours, and then continuous printing was performed at a 0.5% printing rate. Images were checked at every 1000 sheets up to 20000 sheets. Then, it was confirmed whether a density difference between a printing portion and a non-printing portion due to filming was visually confirmed, and then the presence or absence of the generation of filming was evaluated.

Examples 2 to 36

Developing rollers according to Examples 2 to 36 were produced in the same manner as in Example 1, except changing materials of the electro-conductive resin layer as shown in the following table 5. Then, the electro-conductive rollers according to Examples 2 to 36 were evaluated in the same manner as in Example 1. The evaluation results as a developing roller are shown in Table 6.

Comparative Examples 1 to 6

Developing rollers according to Comparative Examples 1 to 6 were produced in the same manner as in Example 1, except changing materials of the electro-conductive resin layer as shown in the following table 5. Then, the electro-conductive rollers according to Comparative Examples 1 to 6 were evaluated in the same manner as in Example 1. The evaluation results as a developing roller are shown in Table 6.

TABLE 5

| | | Hydroxyl group-containing silicone graft fluororesin | | Polyol | | | Isocyanate compound | | |
|---|---|---|---|---|---|---|---|---|---|
| | | No. | Parts by mass | No. | Structure | Parts by mass | No. | Structure | Parts by mass |
| Examples | 1 | L-1 | 1 | P-1 | (A101) | 69.5 | B-1 | (A101) | 53.5 |
| | 2 | | 5 | | | | | | |
| | 3 | | 20 | | | 51.8 | | | 63.4 |
| | 4 | | 30 | | | 42.8 | | | 68.1 |
| | 5 | L-2 | 5 | | | 69.5 | | | 53.5 |
| | 6 | L-3 | | | | | | | |
| | 7 | L-4 | | | | | | | |
| | 8 | L-5 | | | | | | | |
| | 9 | L-6 | | | | | | | |
| | 10 | L-7 | | | | | | | |
| | 11 | L-8 | | | | | | | |
| | 12 | L-9 | | | | | | | |
| | 13 | L-6 | | | | 75.1 | B-2 | (A102) | 45.1 |
| | 14 | | | | | 72.4 | B-4 | (A103) | 48.2 |
| | 15 | | | | | 89.5 | "TAKENATE D-120N" (manufactured by Mitsui Chemicals, Inc.) | — | 20.0 |
| | 16 | | | P-2 | (A101) | 62.8 | B-1 | (A101) | 65.2 |
| | 17 | | | | | 70.8 | B-3 | (A102) | 54.7 |
| | 18 | | | | | 69.9 | B-5 | (A104) | 55.3 |
| | 19 | | | | | 92.4 | "DURANATE 22A-75P" (manufactured by Asahi Kasei Corporation.) | — | 18.6 |
| | 20 | | | P-3 | (A101) | 55.4 | B-1 | (A101) | 78.1 |
| | 21 | | | | | 63.1 | B-5 | (A104) | 67.7 |
| | 22 | | | P-4 | (A102) | 61.9 | B-2 | (A102) | 73.7 |
| | 23 | | | | | 62.2 | B-3 | (A102) | 70.7 |
| | 24 | | | P-6 | (A102) | 72.3 | B-2 | (A102) | 53.6 |
| | 25 | | | | | 68.0 | B-4 | (A103) | 55.9 |
| | 26 | | | P-7 | (A102) | 42.3 | B-1 | (A101) | 101.1 |
| | 27 | | | | | 84.1 | "DURANATE 22A-75P" (manufactured by Asahi Kasei Corporation.) | — | 39.0 |
| | 28 | | | P-8 | (A103) | 32.3 | B-1 | (A101) | 118.6 |
| | 29 | | | | | 40.7 | B-3 | (A102) | 111.1 |
| | 30 | | | P-9 | (A103) | 62.4 | B-4 | (A103) | 65.4 |
| | 31 | | | | | 66.5 | B-5 | (A104) | 61.4 |
| | 32 | | | P-10 | (A104) | 55.4 | B-1 | (A101) | 78.1 |
| | 33 | | | | | 64.1 | B-3 | (A102) | 67.1 |
| | 34 | | | | | 63.1 | B-5 | (A104) | 67.7 |
| | 35 | | | | | 82.4 | "DURANATE 22A-75P" (manufactured by Asahi Kasei Corporation.) | — | 33.8 |

TABLE 5-continued

| | | Hydroxyl group-containing silicone graft fluororesin | | Polyol | | | Isocyanate compound | | |
|---|---|---|---|---|---|---|---|---|---|
| | | No. | Parts by mass | No. | Structure | Parts by mass | No. | Structure | Parts by mass |
| | 36 | | | | | 90.0 | "DURANATE 22A-75P" (manufactured by Asahi Kasei Corporation.) | — | 24.6 |
| Comparative Examples | 1 | L-6 | 5 | P-11 | — | 64.2 | "TAKENATE D-120N" (manufactured by Mitsui Chemicals, Inc.) | — | 68.5 |
| | 2 | | | | | 77.5 | "DURANATE 22A-75P" | — | 55.1 |
| | 3 | | | P-12 | — | 91.2 | (manufactured by Asahi Kasei Corporation.) | | 21.4 |
| | 4 | | | P-13 | — | 81.4 | "TAKENATE D-120N" (manufactured by Mitsui Chemicals, Inc.) | — | 35.7 |
| | 5 | Solvent soluble fluororesin "LUMIFLON LF-200" (manufactured by Asahi Glass Co., Ltd.) | 5 | P-6 | (A102) | 72.3 | B-2 | (A102) | 53.6 |
| | 6 | Silicone oil "KF-96-500cs" (manufactured by Shin-Etsu Chemical Co., Ltd.) | 5 | P-9 | (A103) | 66.5 | B-5 | (A104) | 61.4 |

TABLE 6

| | | Structure in hydroxyl group-containing silicone graft fluororesin | Structure of A1 in Formula (1) | Amount of deformation (μm) | Set mark image evaluation rank | Toner stick density (Reflectivity reduction amount) | Filming |
|---|---|---|---|---|---|---|---|
| Examples | 1 | (2)(3) | (A101) | 1.7 | A | 1.49 | None |
| | 2 | | | 1.5 | A | 0.79 | None |
| | 3 | | | 1.9 | A | 0.78 | None |
| | 4 | | | 2.7 | A | 0.77 | None |
| | 5 | | | 1.4 | A | 0.84 | None |
| | 6 | | | 1.8 | A | 0.81 | None |
| | 7 | | | 1.5 | A | 0.79 | None |
| | 8 | | | 1.8 | A | 1.83 | None |
| | 9 | | | 1.7 | A | 0.80 | None |
| | 10 | | | 1.5 | A | 0.75 | None |
| | 11 | | | 1.4 | A | 1.91 | None |
| | 12 | | | 1.6 | A | 1.85 | None |
| | 13 | | (A101)(A102) | 1.4 | A | 0.77 | None |
| | 14 | | (A101)(A103) | 1.3 | A | 0.78 | None |
| | 15 | | (A101) | 2.1 | A | 0.80 | None |
| | 16 | | | 1.7 | A | 0.78 | None |
| | 17 | | (A101)(A102) | 1.1 | A | 0.81 | None |
| | 18 | | (A101)(A104) | 1.4 | A | 0.81 | None |
| | 19 | | (A101) | 2.3 | A | 0.80 | None |
| | 20 | | | 1.4 | A | 0.79 | None |
| | 21 | | (A101)(A104) | 1.6 | A | 0.80 | None |
| | 22 | | (A102) | 1.5 | A | 0.79 | None |
| | 23 | | | 1.7 | A | 0.78 | None |
| | 24 | | | 1.6 | A | 0.79 | None |
| | 25 | | (A102)(A103) | 1.4 | A | 0.80 | None |
| | 26 | | (A101)(A102) | 1.5 | A | 0.81 | None |
| | 27 | | (A102) | 2.2 | A | 0.78 | None |
| | 28 | | (A101)(A103) | 1.4 | A | 0.79 | None |
| | 29 | | (A102)(A103) | 1.7 | A | 0.81 | None |
| | 30 | | (A103) | 1.8 | A | 0.77 | None |
| | 31 | | (A103)(A104) | 1.6 | A | 0.79 | None |
| | 32 | | (A101)(A104) | 1.8 | A | 0.80 | None |
| | 33 | | (A102)(A104) | 1.4 | A | 0.81 | None |
| | 34 | | (A104) | 3.1 | B | 0.81 | None |
| | 35 | | | 3.4 | B | 0.80 | None |
| | 36 | | | 3.2 | B | 0.78 | None |

TABLE 6-continued

| | | Structure in hydroxyl group-containing silicone graft fluororesin | Structure of A1 in Formula (1) | Amount of deformation (μm) | Set mark image evaluation rank | Toner stick density (Reflectivity reduction amount) | Filming |
|---|---|---|---|---|---|---|---|
| Comparative Examples | 1 | (2)(3) | — | 8.1 | D | 0.80 | None |
| | 2 | | — | 8.4 | D | 0.82 | None |
| | 3 | | — | 8.2 | D | 0.79 | None |
| | 4 | | — | 8.1 | D | 0.80 | None |
| | 5 | (2) | (A102) | 1.7 | A | 2.47 | Occurred at 15000th sheet |
| | 6 | — | (A103)(A104) | 10.7 | D | 0.81 | None |

In the developing rollers according to Examples 1 to 36, the amount of deformation after allowed to stand in the severe environment over a long period of time was small and the images were also good because the silicone graft fluororesin in the electro-conductive resin layer had the structure represented by Formula (1). Moreover, the toner stick in the severe environment was also prevented at a high level, and good filming resistance performance was shown even in the L/L environment. Among Examples, the developing rollers according to Examples 1 to 7, 9 to 10, and 13 to 36 in which the number average molecular weight of the silicone portion in the silicone graft fluororesin was 15000 or more exhibited a better toner stick value of 1.5% or less. Moreover, in the developing rollers according to Examples 1 to 33 having the structures of (A101) to (A103) in the structure represented by Formula (1) of the resin of the electro-conductive resin layer, the amount of deformation after allowed to stand in the severe environment over a long period of time was as small as less than 3 μm and the images were better.

On the other hand, the developing rollers according to Comparative Examples 1 to 4 exhibited good filming resistance performance in the L/L environment. However, since the urethane resin did not have the structure represented by Formula (1), the amount of plastic deformation after allowed to stand in the severe environment over a long period of time was large and the images were not good. In the developing roller according to Comparative Example 5, the resin in the resin layer had the structure represented by Formula (1), and therefore a good set image with a small amount of deformation after allowed to stand in the severe environment over a long period of time was obtained. However, the resin did not have a side chain having the siloxane structure, the toner stick in the severe environment arose and the filming resistance was not good in the L/L environment. Silicone oil was added to the developing roller according to Comparative Example 6, and therefore, the toner stick was prevented and good filming resistance in the L/L environment was exhibited. However, rigid fluororesin was not contained in the resin layer, and therefore the amount of plastic deformation after allowed to stand in the severe environment over a long period of time was large.

Charging Roller

Example 37

Preparation of Elastic Roller D-2

Materials shown in the following table 7 were mixed with a pressurization kneader to obtain an A-kneaded rubber composition No. 1.

TABLE 7

| Material name | Compounding amount (Part(s) by mass) |
|---|---|
| NBR rubber material (Trade Name, Nipol DN219; manufactured by ZEON CORPORATION) | 100 |
| Carbon black (Trade Name, TOKABLACK #7360SB; manufactured by Tokai Carbon Co., Ltd.) | 40 |
| Calcium carbonate (Trade Name, NANOX #30; manufactured by MARUO CALCIUM Co., Ltd.) | 20 |
| Stearic acid (Trade Name, Stearic acid S; manufactured by KAO CORPORATION) | 1 |
| Zinc oxide | 5 |

Furthermore, 177 parts by mass of the A-kneaded rubber No. 1 and materials shown in the following table 8 were mixed with each other with an open roll to obtain an unvulcanized rubber composition No. 1.

TABLE 8

| Material name | Compounding amount (Parts by mass) |
|---|---|
| Sulfur (Trade Name, Sulfax 200s; manufactured by Tsurumi Chemical Industry Co., Ltd.) | 1.2 |
| Tetrabenzylthiuram disulfide (Trade Name, TBZTD; manufactured by SANSHIN CHEMICAL INDUSTRY CO., LTD.) | 4.5 |

Using the unvulcanized rubber composition No. 1, an unvulcanized elastic layer was provided on the mandrel with a crosshead extruder, and then heated in an oven heated to a temperature of 160° C. for 70 minutes to cure the unvulcanized elastic layer. Thereafter, the surface of the elastic layer was ground with a rotary grinding wheel. Thus, an elastic roller D-2 was obtained in which the diameter of a central portion was 8.5 mm and the diameter at each position with a distance of 90 mm from the central portion toward both end portions was 8.4 mm.

A charging roller according to Example 37 was produced in the same manner as in Example 1, except using the elastic roller D-2 and changing materials of the electro-conductive resin layer as shown in the following table 9.

TABLE 9

| | | Hydroxyl group-containing silicone graft fluororesin No. | Parts by mass | Polyol No. | Polyol Structure | Polyol Parts by mass | Curing agent No. | Curing agent Structure | Curing agent Parts by mass |
|---|---|---|---|---|---|---|---|---|---|
| Examples | 37 | L-1 | 5 | P-1 | (A101) | 69.5 | B-1 | (A101) | 53.5 |
| | 38 | L-5 | | | | | "TAKENATE D-120N" (manufactured by Mitsui Chemicals, Inc.) | — | 20.0 |
| | 39 | | | P-4 | (A102) | 61.9 | B-2 | (A102) | 73.7 |
| | 40 | | | P-7 | (A102) | 42.3 | B-1 | (A101) | 101.1 |
| | 41 | | | P-9 | (A103) | 62.4 | B-4 | (A103) | 65.4 |
| Comparative Examples | 7 | L-5 | 5 | P-11 | — | 64.2 | "TAKENATE D-120N" (manufactured by Mitsui Chemicals, Inc.) | — | 68.5 |
| | 8 | | | P-12 | — | 91.2 | "DURANATE 22A-75P" (manufactured by Asahi Kasei Corporation.) | — | 21.4 |
| | 9 | Silicone oil "KF-96-500cs" (manufactured by Shin-Etsu Chemical Co., Ltd.) | | P-9 | (A103) | 66.5 | B-5 | (A104) | 61.4 |

The charging roller according to Example 37 thus obtained was evaluated for the following items. The evaluation results as a charging roller are shown in Table 10.

Measurement of Amount of Deformation and Evaluation of Set Mark Image

A black toner cartridge for a laser beam printer (Trade Name "HP LaserJet Enterprise Color CP4515dN", manufactured by HP) having the configuration of FIG. 3 was prepared. A charging roller attached to the laser beam printer was removed from the cartridge, and then the charging roller according to Example 37 was attached thereto. The cartridge was allowed to stand still for 60 days in the severe environment in a state where the charging roller and the photoconductor contacted each other. The pressing pressure by a spring was changed so that the contact pressure of the charging roller and the photoconductor was 5.0 N at one end, i.e., 10.0 N in total at both ends. Thereafter, the cartridge was allowed to stand still in the environment of a temperature of 23° C. and a relative humidity of 55% RH for 6 hours. The resultant cartridge was loaded into the laser beam printer, halftone images were output, and then set mark images were evaluated according to the following criteria. Due to an increase in the resistance of the charging roller, uneven density in a thin streak shape arose in the halftone images in some cases. Such an image is referred to as a transverse streak in an image. The streak in an image tends to be more noticeable with an increase in the resistance due to sticking of toner and the like to the surface of the charging roller.

A: No transverse streaks are observed.

B: Transverse streaks are slightly generated only in an image end portion.

C: Transverse streaks are generated in an almost half area of the image and are noticeable.

The charging roller was removed from the evaluated process cartridge, and then the amount of deformation (μm) of the radius of the charging roller was measured in the same manner as in the evaluation of the developing roller.

Evaluation of transverse streaks in image in L/L environment

A black toner cartridge for a laser beam printer (Trade Name "HP LaserJet Enterprise Color CP4515dN", manufactured by HP) having the configuration of FIG. 3 was prepared. A charging roller attached to the laser beam printer was removed from the cartridge, and then the charging roller according to Example 37 was attached thereto. Then, the cartridge was placed in the laser beam printer, and then allowed to stand in the L/L environment for 2 hours after the placement. Subsequently, a durability test of continuously outputting 4% black printing density images (images in which transverse lines with a width of 2 dots and an interval of 50 dots were drawn in a direction perpendicular to the rotation direction of a photoconductor) was performed. Halftone images (images in which transverse lines with a width of 1 dot and an interval of 2 dots were drawn in a direction perpendicular to the rotation direction of a photoconductor) were output in order to check the images after 100 images and 10000 images were output. The obtained images were visually observed, and then evaluated for the transverse streaks according to the following criteria. Images after 100 images were output were early images and images after 10000 images were output were images after durability.

A: No transverse streaks are observed.

B: Transverse streaks are slightly generated only in an image end portion.

C: Transverse streaks are generated in an almost half area of the image and are noticeable.

Examples 38 to 42

Charging rollers according to Examples 38 to 42 were produced in the same manner as in Example 37, except changing materials of the electro-conductive resin layer as shown in Table 9. The electro-conductive rollers according to Examples 38 to 42 were evaluated in the same manner as in Example 37. The evaluation results as a charging roller are shown in Table 10.

Comparative Examples 7 to 9

Charging rollers according to Comparative Examples 7 to 9 were produced in the same manner as in Example 37, except changing materials of the electro-conductive resin layer as shown in Table 9. The electro-conductive rollers according to Comparative Examples 7 to 9 were evaluated in the same manner as in Example 37. The evaluation results as a charging roller are shown in Table 10.

TABLE 10

| | Structure in hydroxyl group-containing silicone graft fluororesin | Structure of A1 in Formula (1) | Amount of deformation (μm) | Set mark image | Evaluation of early transverse streaks in image | Evaluation of transverse streaks in image after durability |
|---|---|---|---|---|---|---|
| Example 37 | (2)(3) | (A101) | 5.2 | A | A | A |
| Example 38 | | (A101) | 5.1 | A | A | A |
| Example 39 | | (A102) | 5.3 | A | A | A |
| Example 40 | | (A101)(A102) | 5.4 | A | A | A |
| Example 41 | | (A103) | 5.2 | A | A | A |
| Example 42 | | (A104) | 8.1 | B | A | A |
| Comparative Example 7 | (2)(3) | — | 13.2 | C | A | A |
| Comparative Example 8 | | — | 14.1 | C | A | A |
| Comparative Example 9 | — | (A103)(A104) | 13.4 | C | A | A |

In the charging rollers according to Examples 37 to 42, the amount of deformation after allowed to stand in the severe environment over a long period of time was small and the images were also good because the urethane resin in the electro-conductive resin layer had the structure represented by Formula (1). Moreover, the good images were maintained even after the charging rollers were subjected to the durability test in the L/L environment.

Among Examples, particularly in the charging rollers according to Examples 37 to 41 in which the urethane resin had the structures of (A101) to (A103) in the structure represented by Formula (1), the amount of deformation was as small as less than 5 μm after allowed to stand in the severe environment over a long period of time and images were also better.

On the other hand, in the charging rollers according to Comparative Examples 7 and 8, good images were maintained even after subjected to the durability test in the L/L environment. However, the urethane resin did not have the structure represented by Formula (1), and therefore the amount of deformation after allowed to stand in the severe environment over a long period of time was large and images were not good. The charging roller according to Comparative Example 9 did not contain rigid fluororesin in the resin layer, and therefore the amount of plastic deformation after allowed to stand in the severe environment over a long period of time was large and images were not good.

Developing Blade

Example 43

As a support base material, a 0.08 mm thick SUS (stainless steel) sheet (manufactured by Nisshin Steel Co., Ltd.) was press-cut into a dimension of a length of 200 mm and a width of 23 mm. Next, the cut SUS (stainless steel) sheet was dipped in the coating solution for forming an electro-conductive resin layer according to Example 37 so that a length 43 from a longitudinal end portion of the cut SUS sheet was 1.5 mm as illustrated in FIG. 2 to form a coating film of the coating solution, followed by drying. Furthermore, by heat-treating the same at a temperature of 140° C. for 1 hour, an electro-conductive resin layer 42 having a film thickness 44 of 10 μm was formed on the surface in the longitudinal end portion of the SUS sheet to produce a developing blade according to Example 43.

The developing blade according to Example 43 thus obtained was evaluated for the following items.

Evaluation of Recovery Performance of Developing Blade Deformation

Figure 6:
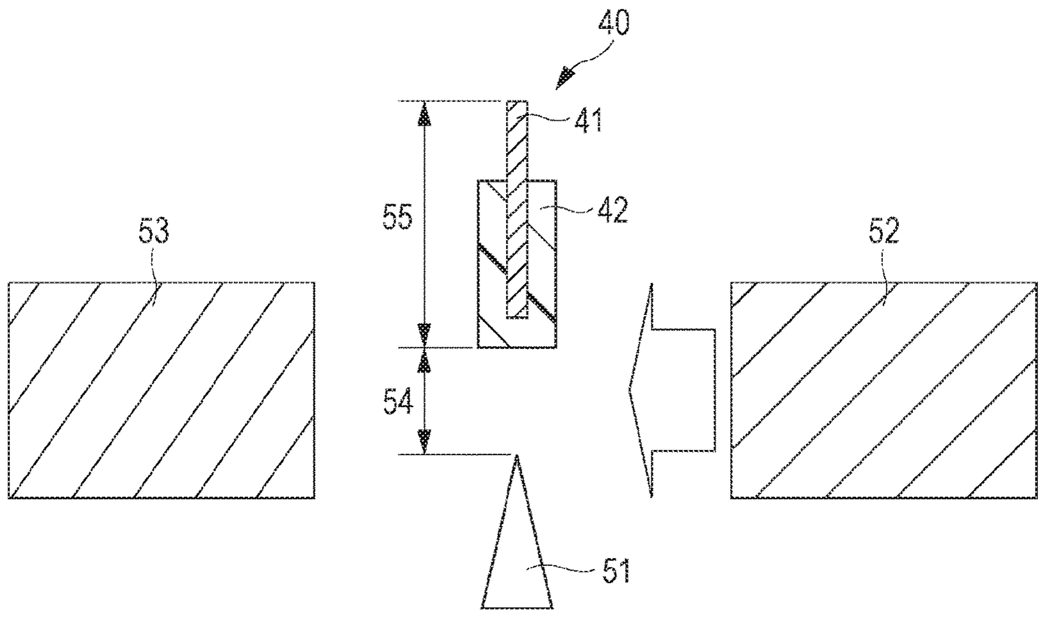
FIG. 6 is a schematic view of a measuring apparatus of the amount of deformation of an electro-conductive blade.

The developing blade according to Example 43 was evaluated for deformation recovery performance using an apparatus illustrated in FIG. 6. The measuring apparatus has an LED dimension measuring device (Trade Name "LS-7000"; manufactured by KEYENCE CORP.) having a gripping portion (not illustrated) fixing the support base material 41 of the developing blade 40, a reference plate 51, an LED light emission portion 52, and a light receiving portion 53.

First, a distance 55 from an end portion on the side where the electro-conductive resin layer 42 was not formed of the support base material 41 of the developing blade 40 to the tip on the side of the electro-conductive resin layer 42 of the developing blade 40 was determined. The distance 55 was calculated by measuring a gap amount 54 between the tip of the developing blade 40 and the reference plate 51. The measurement of the gap amount 54 between the surface of the developing blade 40 and the reference plate 51 was performed at two points in total of positions with a distance of 20 mm from both end portions in the longitudinal direction of the developing blade 40 to the center side in the longitudinal direction. The measurement was performed in an environment of a temperature of 23° C. and a relative humidity of 55% RH using a blade which was allowed to stand in an environment of a temperature of 23° C. and a relative humidity of 55% RH for 6 hours or more.

Next, the developing blade 40 which was measured beforehand as described above was placed in a cyan cartridge for a laser beam printer (Trade Name "LBP7700C", manufactured by CANON KABUSHIKI KAISHA) so that the tip of the developing blade 40 contacted a developing roller. However, the developing roller was changed to a metal roller with a diameter of 12 mm and the contact pressure of the developing blade 40 was adjusted to 0.6 N/cm, so that the conditions were changed to conditions where deformation was more likely to occur than usual.

Next, the cartridge was allowed to stand for 30 days in the severe environment. Thereafter, the developing blade 40 was removed from the cartridge, and then allowed to stand in an environment of a temperature of 23° C. and a relative humidity of 55% RH for 1 hour. Thereafter, the distance 55 from an end portion on the side of the support base material 41 of the developing blade 40 to the tip on the side of the electro-conductive resin layer 42 of the developing blade 40 was measured similarly to the measurement before contacting in an environment of a temperature of 23° C. and a relative humidity of 55% RH. The measurement was performed at two places at the same positions as those of the measurement portions before allowed to stand in the severe environment.

In each measurement position, the amount of changes of the distance 55 from the end portion on the side of the support base material 41 of the developing blade 40 to the tip portion on the side of the electro-conductive resin layer 42 of the developing blade 40 before and after the contacting in a high temperature and high humidity environment at the contact position with a metal roller was determined. The average value of the amount of changes was defined as the amount of deformation [μm].

Evaluation of Density Difference Between Central Portion and End Portion of Image When the developing blade is deformed, uneven density may arise in an output image. This is because the contact state with the developing blade varies between a portion where the developing roller was deformed and a portion where the developing roller was not deformed, so that the image density of a portion corresponding to the deformed portion of the developing roller increases in the output image. In particular, deformation is likely to occur at both end portions in the longitudinal direction of the developing blade where the contact pressure is high, and therefore the image density becomes high in a portion corresponding to such a portion of the output image.

Then, in order to evaluate the influence of the deformation of the developing blade on the images, the image density difference of portions corresponding to a central portion and end portions in the longitudinal direction of the developing blade in the output image was measured as follows.

The developing blade in which the evaluation of the above-described "Deformation recovery performance" was completed was placed in a cyan cartridge for a laser beam printer (Trade Name "LBP7700C", manufactured by CANON KABUSHIKI KAISHA). The cartridge was loaded into the laser beam printer, and then solid images were output. The density of the obtained solid images was measured, and then evaluated according to the following criteria. The time from the evaluation of deformation recovery performance to the output of the solid images was set to 1 hour. In the obtained solid images, the image density was measured at arbitrary five points of portions corresponding to the central portion in the longitudinal direction and positions with a distance of 3 cm from the end portions to the central portion in the longitudinal direction of the developing blade using a reflection densitometer (Trade Name "GreatagMacbethRD918", manufactured by Macbeth). The average value was determined for each of the image density of the central portion and the image density of both end portions, and then the image density difference between the central portion and the end portions was determined. The image density difference was evaluated according to the following criteria.

A: Image density difference is less than 0.1.
B: Image density difference is 0.1 or more and less than 0.3.
C: Image density difference is 0.3 or more.

Vertical Streak Evaluation after Durability

Sticking of toner to the developing blade may cause uneven density in a fine streak shape on an output image in a direction perpendicular to the rotation direction of a photoconductor. The image is referred to as a vertical streak in an image. The vertical streak in an image appears due to the fact that toner does not uniformly coat the developing roller owing to the generation of a stuck substance on the developing blade.

Then, a durability test was performed using the developing blade according to Example 43 as follows, and then the presence or absence of the generation of the vertical streak in an image after the durability test was evaluated.

A black toner cartridge for a laser beam printer (Trade Name "LBP7700C", manufactured by CANON KABUSHIKI KAISHA) having the configuration of FIG. 3 was prepared. A developing blade attached thereto was removed from the cartridge, the developing blade according to Example 43 was attached thereto, and then the cartridge was allowed to stand in the L/L environment for 2 hours after placed. Subsequently, a durability test of continuously outputting 1% black printing density images was performed. After 10000 images were output, a solid image was output in order to check the image. Then, the obtained images were visually observed, and then the presence or absence of the generation of vertical streaks was evaluated according to the following criteria.

A: No vertical streaks are observed.
B: Vertical streaks are slightly generated only in an image end portion.
C: Vertical streaks are generated in an almost half area of the image and are noticeable.

Example 44

A developing blade according to Example 44 was produced in the same manner as in Example 43, except changing the coating solution for forming an electro-conductive resin layer to one prepared in Example 39. Moreover, a developing blade according to Example 45 was produced in the same manner as in Example 43, except changing the coating solution for forming an electro-conductive resin layer to one prepared in Example 41 and a developing blade according to Example 46 was produced in the same manner as in Example 43, except changing the coating solution to one prepared in Example 42. The developing blades according to Examples 44 to 46 were evaluated in the same manner as in Example 43. The evaluation results as a developing blade are shown in Table 11.

Comparative Examples 10 to 12

Developing blades according to Comparative Examples 10 to 12 were produced in the same manner as in Example 43, except changing the coating solution for forming an electro-conductive resin layer to those prepared in Comparative Examples 7 to 9, respectively. The developing blades according to Comparative Examples 7 to 9 were evaluated in the same manner as in Example 43. The evaluation results as a developing blade are shown in Table 11.

TABLE 11

| | Structure in hydroxyl group-containing silicone graft fluororesin | Structure of A1 in Formula (1) | Amount of deformation (μm) | Evaluation of image density difference | Evaluation of vertical streaks in image |
|---|---|---|---|---|---|
| Example 43 | (2)(3) | (A101) | 2.0 | A | A |
| Example 44 | | (A102) | 2.1 | A | A |
| Example 45 | | (A103) | 2.0 | A | A |
| Example 46 | | (A104) | 2.5 | B | B |
| Comparative Example 10 | (2)(3) | — | 5.0 | C | A |
| Comparative Example 11 | | — | 4.7 | C | A |
| Comparative Example 12 | — | (A103)(A104) | 7.1 | C | A |

In the developing blades according to Examples 43 to 46, the urethane resin in the electro-conductive resin layer had the structure represented by Formula (1), and therefore the amount of deformation after allowed to stand in the severe environment over a long period of time was small and the image density difference was also small. Moreover, good images were obtained after the developing blades were subjected to the durability test in the L/L environment.

Among Examples, particularly in the developing blades according to Examples 43 to 45 in which the urethane resin had the structures of (A101) to (A103) in the structure represented by Formula (1), the amount of deformation after allowed to stand in the severe environment over a long period of time was small and the density difference was also smaller.

On the other hand, in the developing blades according to Comparative Examples 10 and 11, good images were maintained even after subjected to the durability test in the L/L environment. However, the urethane resin did not have the structure represented by Formula (1), and therefore the amount of plastic deformation after allowed to stand in the severe environment over a long period of time was large and images were not good. Moreover, the developing blade according to Comparative Example 12 did not contain rigid fluororesin in the resin layer, and therefore the amount of plastic deformation after allowed to stand in the severe environment over a long period of time was large and image were not good.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-237992, filed Dec. 4, 2015 which is hereby incorporated by reference herein in its entirety.

What is claimed is:

1. A member for electrophotography comprising:

an electro-conductive base; and at least one electro-conductive resin layer, wherein the electro-conductive resin layer of an outermost layer contains urethane resin, and the urethane resin has a structure of a silicone graft fluororesin and a structure represented by Formula (1)

(1)

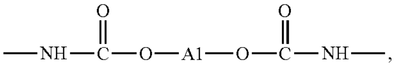

, wherein, in Formula (1), A1 represents at least one structure selected from the group consisting of (A101), (A102), (A103), and (A104);

the (A101) structure containing a structure represented by Formula (A101a) shown below and a structure represented by either or both of Formula (A101b) and Formula (A101c)

(A101a)

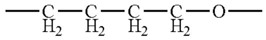

(A101b)

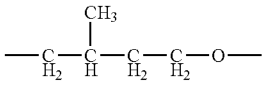

(A101c)

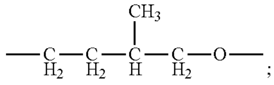

;

the (A102) structure containing a constituent unit represented by Formula (A102a) and a constituent unit represented by either or both of Formula (A102b) and Formula (A102c)

(A102a)

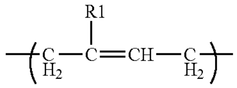

(A102b)

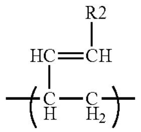

(A102c)

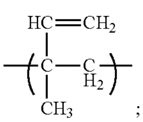

;

wherein, in Formulae (A102a) to (A102c), R1 and R2 each independently represent a hydrogen atom or an alkyl group having carbon atoms of 1 or more and 4 or less;

the (A103) structure represented by Formula (A103a)

(A103a)

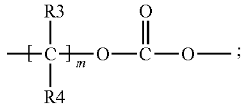

wherein, in Formula (A103a), R3 and R4 each independently represent a hydrogen atom or an alkyl group having carbon atoms of 1 or more and 4 or less and m represents an integer of 7 or more; and the (A104) structure represented by Formula (A104a)

(A104a)

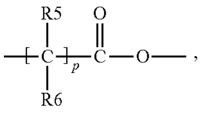

wherein, in Formula (A104a), R5 and R6 each independently represent a hydrogen atom or an alkyl group having carbon atoms of 1 or more and 4 or less and p represents an integer of 6 or more.

2. The member for electrophotography according to claim 1, wherein the structure of the silicone graft fluororesin has structures represented by Formula (2) and Formula (3)

(2)

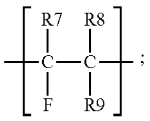

wherein, in Formula (2), R7 represents any one selected from the group consisting of a hydrogen atom, a halogen atom, an alkyl group having carbon atoms of 1 or more and 10 or less, and a substituted or unsubstituted aryl group having carbon atoms of 6 or more and 10 or less, and R8 and R9 each independently represent any one selected from the group consisting of a hydrogen atom, a halogen atom, an alkyl group having carbon atoms of 1 or more and 10 or less, and a substituted or unsubstituted aryl group having carbon atoms of 6 or more and 10 or less, and (3)

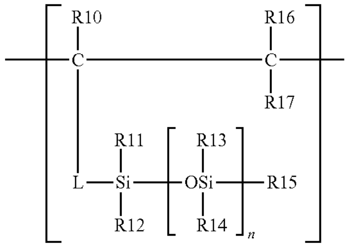

wherein, in Formula (3), R10 represents any one selected from the group consisting of a hydrogen atom, a halogen atom, an alkyl group having carbon atoms of 1 or more and 10 or less, and a substituted or unsubstituted aryl group having carbon atoms of 6 or more and 10 or less, L represents a linking group, R11 to R15 each independently represent a hydrogen atom or an alkyl group having carbon atoms of 1 or more and 2 or less, R16 to R17 each independently represent any one selected from the group consisting of a hydrogen atom, a halogen atom, an alkyl group having carbon atoms of 1 or more and 10 or less, and a substituted or unsubstituted aryl group having carbon atoms of 6 or more and 10 or less, and n represents an integer of 1 or more.

3. The member for electrophotography according to claim 1, wherein the urethane resin is a cured product of a hydroxyl group-containing silicone graft fluororesin, polyol having at least one structure selected from (A101) to (A104), and an isocyanate compound.

4. The member for electrophotography according to claim 2, wherein the linking group L in Formula (3) is a single bond, a straight or branched-chain alkylene group having carbon atoms of 1 or more and 2 or less, or a group in which an arbitrary carbon-carbon bond in the alkylene group is substituted by an ester bond, an ether bond, an amide bond, or a combination of the ester, ether, and amide bonds.

5. The member for electrophotography according to claim 2, wherein a molecular weight of the structure represented by Formula (3) is 15000 or more and 30000 or less.

6. The member for electrophotography according to claim 1, wherein A1 in Formula (1) has at least one structure selected from the group consisting of (A101), (A102), and (A103).

7. The member for electrophotography according to claim 2, wherein the urethane resin has a structure represented by Formula (6)

(6)

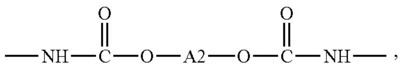

wherein, in Formula (6), A2 is a structure containing a constituent unit represented by Formula (2) and a constituent unit represented by Formula (3).

8. The member for electrophotography according to claim 2, wherein the constituent unit represented by Formula (3) is contained in a branched chain branched from a main chain of a fluororesin frame of the structure of the silicone graft fluororesin.

9. A process cartridge, which is configured to be detachably attachable to a main body of an electrophotographic apparatus, the process cartridge comprising a member for electrophotography, wherein the member for electrophotography comprises:

an electro-conductive base; and at least one electro-conductive resin layer, wherein the electro-conductive resin layer of an outermost layer contains urethane resin, and the urethane resin has a structure of a silicone graft fluororesin and a structure represented by Formula (1)

(1)

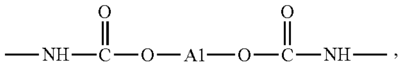

wherein, in Formula (1), A1 represents at least one structure selected from the group consisting of (A101), (A102), (A103), and (A104);

the (A101) structure containing a structure represented by Formula (A101a) shown below and a structure represented by either or both of Formula (A101b) and Formula (A101c)

(A101a)

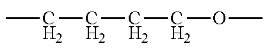

(A101b)

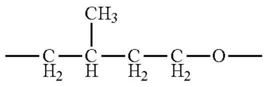

(A101c)

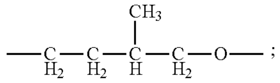

the (A102) structure containing a constituent unit represented by Formula (A102a) and a constituent unit represented by either or both of Formula (A102b) and Formula (A102c)

(A102a)

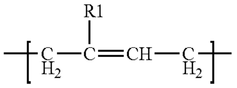

(A102b)

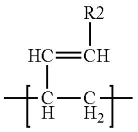

(A102c)

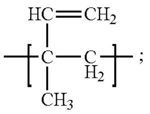

wherein, in Formulae (A102a) to (A102c), R1 and R2 each independently represent a hydrogen atom or an alkyl group having carbon atoms of 1 or more and 4 or less;

the (A103) structure represented by Formula (A103a)

(A103a)

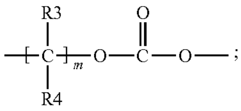

wherein, in Formula (A103a), R3 and R4 each independently represent a hydrogen atom or an alkyl group having carbon atoms of 1 or more and 4 or less and m represents an integer of 7 or more; and the (A104) structure represented by Formula (A104a)

(A104a)

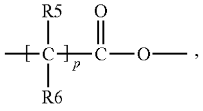

wherein, in Formula (A104a), R5 and R6 each independently represent a hydrogen atom or an alkyl group having carbon atoms of 1 or more and 4 or less and p represents an integer of 6 or more.

10. An electrophotographic apparatus comprising a member for electrophotography, wherein the member for electrophotography comprises:

an electro-conductive base; and at least one electro-conductive resin layer, wherein the electro-conductive resin layer of an outermost layer contains urethane resin, and the urethane resin has a structure of a silicone graft fluororesin and a structure represented by Formula (1)

(1)

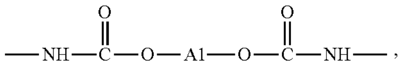

wherein, in Formula (1), A1 represents at least one structure selected from the group consisting of (A101), (A102), (A103), and (A104);

the (A101) structure containing a structure represented by Formula (A101a) shown below and a structure represented by either or both of Formula (A101b) and Formula (A101c)

(A101a)

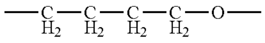

(A101b)

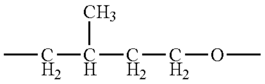

(A101c)

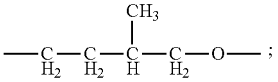

the (A102) structure containing a constituent unit represented by Formula (A102a) and a constituent unit represented by either or both of Formula (A102b) and Formula (A102c)

(A102a)

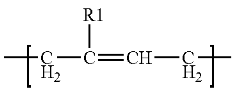

(A102b)

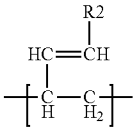

-continued (A102c)

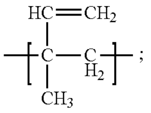

wherein, in Formulae (A102a) to (A102c), R1 and R2 each independently represent a hydrogen atom or an alkyl group having carbon atoms of 1 or more and 4 or less;

the (A103) structure represented by Formula (A103a)

(A103a)

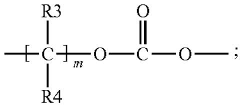

wherein, in Formula (A103a), R3 and R4 each independently represent a hydrogen atom or an alkyl group having carbon atoms of 1 or more and 4 or less and m represents an integer of 7 or more; and the (A104) structure represented by Formula (A104a)

(A104a)

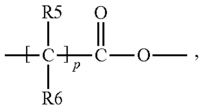

wherein, in Formula (A104a), R5 and R6 each independently represent a hydrogen atom or an alkyl group having carbon atoms of 1 or more and 4 or less and p represents an integer of 6 or more.

* * * * *